United States Patent
Wigren

(10) Patent No.: US 8,208,942 B2
(45) Date of Patent: *Jun. 26, 2012

(54) EXTENDED CLUSTERING FOR IMPROVED POSITIONING

(75) Inventor: Torbjorn Wigren, Uppsala (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 241 days.

This patent is subject to a terminal disclaimer.

(21) Appl. No.: 12/447,841

(22) PCT Filed: Oct. 30, 2006

(86) PCT No.: PCT/SE2006/050440
§ 371 (c)(1),
(2), (4) Date: Apr. 29, 2009

(87) PCT Pub. No.: WO2008/054272
PCT Pub. Date: May 8, 2008

(65) Prior Publication Data
US 2010/0062790 A1    Mar. 11, 2010

(51) Int. Cl.
H04W 24/00    (2009.01)
(52) U.S. Cl. ............ 455/456.1; 455/440; 455/433; 455/446; 342/457; 342/465
(58) Field of Classification Search .......... 455/440, 455/456.1, 433, 446; 342/457, 465
See application file for complete search history.

(56) References Cited

U.S. PATENT DOCUMENTS

| | | | |
|---|---|---|---|
| 5,003,317 A * | 3/1991 | Gray et al. | 342/457 |
| 5,327,144 A * | 7/1994 | Stilp et al. | 342/387 |
| 5,508,707 A | 4/1996 | LeBlanc et al. | |
| 6,026,304 A * | 2/2000 | Hilsenrath et al. | 455/456.2 |
| 6,393,294 B1 * | 5/2002 | Perez-Breva et al. | 455/456.5 |
| 6,421,009 B2 * | 7/2002 | Suprunov | 342/465 |
| 7,072,666 B1 | 7/2006 | Kullman et al. | |
| 2002/0193104 A1 * | 12/2002 | Scherzer et al. | 455/423 |
| 2003/0096620 A1 | 5/2003 | Ozturk et al. | |
| 2003/0146871 A1 | 8/2003 | Karr et al. | |

(Continued)

FOREIGN PATENT DOCUMENTS

WO    WO 91/07043 A1    5/1991

(Continued)

OTHER PUBLICATIONS

International Search Report dated Jun. 27, 2007 (4 pages).

(Continued)

*Primary Examiner* — Nimesh Patel
(74) *Attorney, Agent, or Firm* — Myers Bigel Sibley & Sajovec, P.A.

(57) ABSTRACT

A method for clustering position determinations is used for providing position determination assisting data in a cellular communications network. The method comprises obtaining (209) a main cluster of points, which are results of high-precision position determinations. The method further comprises separating out (220) of at least two subclusters. The points of the subclusters have a local density of points which is above a predetermined local density threshold. A method for providing position determination assisting data in a cellular communications network comprising the clustering of position determinations is also presented as well as an arrangement for providing position determination assisting data in a cellular communications network, a node of a cellular communications network, a cellular communications network and a computer readable medium comprising position determination assisting data are disclosed.

26 Claims, 12 Drawing Sheets

U.S. PATENT DOCUMENTS

2004/0067759 A1     4/2004    Spirito et al.
2005/0192024 A1     9/2005    Sheynblat

FOREIGN PATENT DOCUMENTS

| WO | WO 96/07284 A1 | 3/1996 |
|---|---|---|
| WO | WO 97/15995 A1 | 5/1997 |
| WO | WO 2004/023155 | 3/2004 |
| WO | WO 2006/086788 A1 | 8/2006 |
| WO | WO 2007/086784 | 8/2007 |

OTHER PUBLICATIONS

International Preliminary Report on Patentability corresponding to International Application No. PCT/US2006/050440; Date of mailing: Jun. 27, 2007; 5 pages.

Chinese Office Action (5 pages) corresponding to Chinese Patent Application No. 200680056277.X; Mailing Date: Feb. 16, 2011.

Chinese Office Action Corresponding to Application No. 200680056277; Dated: Sep. 29, 2011; 5 pages, English Translation thereof, 5 pages.

Ester M. et al., "A Density-Based Algorithm for Discovering Clusters in Large Spatial Databases with Noise", *KDD-96 Proceedings, Spatial, Text, & Multimedia*, pp. 226-231.

Lin Cha-Hwa et al., "Mobile Location Estimation by Density-Based Clustering for NLoS Environments", *Proceedings of the 20th International Conference on Advanced Information Networking and Applications*, 2006, 6 pages.

Chinese Office Action Corresponding to Application No. 200680056277; Dated: Dec. 31, 2011; 3 pages.

\* cited by examiner

| CELL ID |
|---------|
| ID1 |
| ID2 |
| ID3 |
| ID4 |
| ID5 |

| No | CELL ID |
|----|---------|
| 1 | ID1 |
| 2 | ID3 |
| 3 | ID5 |
| 4 | ID4 |
| 5 | ID2 |

| No | CELL ID | TYPE |
|----|---------|------|
| 1 | ID1 | OWN CELL |
| 2 | ID3 | ACTIVE |
| 3 | ID5 | ACTIVE |
| 4 | ID4 | IDENTIFY |
| 5 | ID2 | IDENTIFY |

EXTENDED CLUSTERING FOR IMPROVED POSITIONING

TECHNICAL FIELD

The present invention relates in general to methods and systems for position determination of mobile terminals in a cellular communications network, and in particular to such position determination involving cell areas.

BACKGROUND

All cellular communications systems are divided into cells, where User Equipment (UE) served by one, or when in soft(er) handover several base stations. Each base station may serve UEs in more than one cell. The important point from a positioning and navigation perspective is that the cell where a specific UE is located is known in the cellular system. Hence, after determination of the geographical area covered by a specific cell, it can be stated that the UE is located somewhere within said geographical area, as long as it is connected and the reported cell identity of the serving cell is equal to the cell identity corresponding to the particular geographical area.

An example of positioning within a Wideband Code Division Multiple Access (WCDMA) cellular system operates briefly as follows, assuming that the positioning operates over the Radio Access Network Application Part (RANAP) interface. The procedures are however similar for e.g. the Global System for Mobile communications (GSM) and Code Division Multiple Access 2000 (CDMA 2000).

A message requesting a location estimate is received in the Serving Radio Network Controller (SRNC) over the RANAP interface. The quality of service parameters of the message is assumed to be such that the Radio Network Controller (RNC) selects the cell identity positioning method. The SRNC determines the serving cell identity of the UE to be positioned and retrieves a pre-stored polygon that represents the extension of the serving cell. The SRNC sends the resulting cell polygon back to the core network over the RANAP interface, using a cell polygon format in a location report message.

It should, however, be noted that due to the complexity of the radio propagation, the cell polygon format is only an approximation of the extension of the true cell. The selection of the polygon format is dictated by the need to have a reasonably flexible geographical representation format, taking e.g. computation complexities and reporting bandwidths into account.

Since the polygon format approximates the cell extension, the polygon is normally pre-determined in a cell-planning tool to represent the cell extension with a certain confidence. The confidence is intended to represent the probability that the UE is located within the polygon, conditioned on the fact that it is connected to the cell that is represented by the cell polygon. The underlying off-line calculation of the cell polygon can e.g. be based on coverage simulations of varying levels of sophistication. However, the end result is normally not very reliable when the confidence of the calculated cell extension is considered.

A particular difficult task is cell-ID positioning in cells having a complex distribution pattern for the probability of locations of UEs. The defined cell extension will typically also include areas where the probability to find a UE is very low. This obviously decreases the overall level of positioning accuracy.

The accuracy of the cell identity positioning method is mainly limited by the size of the cell, something that prevents it from being used in more sophisticated navigation applications. Its main advantages include a very low response time as well as the fact that it is widely spread and always available where there is cellular coverage. The cell identity method is also straightforward to implement and has no UE impact. The advantages has lead to an interest for the development of Enhanced cell identity (E-cell ID) positioning methods that aim at enhancing the accuracy of the basic cell identity method at the same time as the advantages of the method are retained.

One principle for E-cell ID positioning aims at combining the cell extension model with a distance measure. Two possibilities towards this end are Round Trip Time (RTT) measurements and path loss measurements. The most accurate of these two alternatives is the RTT measurement. The path loss measurement suffers from shadow fading effects. which result in accuracies that are of the order of half the distance to the UE. In the RTT measurement principle, the travel time of radio waves from the Radio Base Station (RBS) to the UE and back is measured. The RTT method alone defines a circle around the RBS. By combining this information with the cell polygon, left and right angles of the circle can be computed.

Another idea for enhanced cell identity positioning has been to use pre-calculated maps of the regions where the UE is in soft(er) handover with one or several cells. Such areas are significantly smaller than the whole cell opening up for a better accuracy of the determined position. Normally these maps are pre-calculated in the planning tool, exactly as the ordinary cell polygons.

In some situations high-precision positioning is required. In the present disclosure, "high-precision positioning methods" are defined to denote positioning methods that have a potential to meet the North-American E-911 emergency positioning requirements. Methods that meet these requirements are capable of obtaining positioning accuracies of:

either (terminal based) 50 meters (67%) and 150 m (95%), or (network based) 100 meters (67%) and 300 m (95%).

Assisted Global Positioning System (A-GPS) positioning is an enhancement of the Global Positioning System (GPS). GPS reference receivers attached to e.g. a cellular communication system collect assistance data that, when transmitted to GPS receivers in terminals connected to the cellular communication system, enhance the performance of the GPS terminal receivers. Typically, A-GPS accuracy can become as good as 10 meters. Additional assistance data is collected from the cellular communication system directly, typically to obtain a rough initial estimate of the position of the terminal together with a corresponding uncertainty of the initial estimate. This position is often given by a cell identity positioning step.

The Uplink Time Difference Of Arrival (UTDOA) positioning method is based on time of arrival measurements performed in several RBSs of transmissions from the UEs. The signal strengths are higher than in A-GPS, something that enhances the ability to perform positioning indoors. The accuracy of UTDOA is expected to be somewhat worse than that of A-GPS though, mainly because the radio propagation conditions are worse along the surface of the earth than when GPS radio signals are received from satellites at high elevation angles.

A general problem with existing positioning methods based on cell-ID is that the accuracy of the determined positions is low, in particular for cells having complex shapes for UE positioning. The confidence value is normally not determined with the best possible accuracy, with respect to the calculated cell area.

SUMMARY

A general object of the present invention is thus to provide for methods, devices and systems giving possibilities for improved position determination accuracy. A further object is to provide for methods and devices providing positioning assisting data allowing for position determinations of a higher accuracy, in particular for cells having complex shapes for UE positioning. Yet a further object of the present invention is to provide for methods, devices and systems operating with smaller distinguishable areas. It is also a further object of the present invention is to provide for methods, devices and systems which provides defined areas having a well established confidence value.

The above objects are achieved by methods, devices and systems according to the enclosed patent claims. In general words, in a first aspect, a method for clustering position determinations is used for providing position determination assisting data in a cellular communications network. The method comprises obtaining a main cluster of points, which are results of high-precision position determinations. The method further comprises separating out of at least two subclusters. The points of the subclusters have a local density of points which is above a predetermined local density threshold.

In a second aspect, a method for providing position determination assisting data in a cellular communications network comprises establishing of a cell relation configuration for a user equipment. The cell relation configuration comprises at least cell identities of cells, in which signals to and/or from the user equipment fulfill at least a specific radio condition criterion when received. The method further comprises performing of a high-precision position determination for the user equipment. The establishing and performing steps are repeated a plurality of times. The method further comprises clustering of points being results of the high-precision position determinations belonging to the same cell relation configuration in separate main clusters of points and splitting at least one of the separate main clusters of points in subclusters according to the first aspect. The method also comprises associating of an area definition with at least one of the main clusters of points and creating of position determination assisting data comprising a relation between the cell relation configurations and the associated area definitions.

In a third aspect, an arrangement for providing position determination assisting data in a cellular communications network comprises means for establishing a cell relation configuration for a user equipment. The cell relation configuration comprises at least cell identities of cells, in which signals to and/or from the user equipment fulfill at least a specific radio condition criterion when received. The arrangement further comprises means for performing a high-precision position determination for the user equipment and means for clustering results of the high-precision position determinations belonging to the same cell relation configuration in separate main clusters of points. The means for clustering results is further arranged for separating out, from at least one of the separate main clusters, at least two subclusters. The points of the subclusters have a local density of points above a predetermined local density threshold. The arrangement further comprises means for associating an area definition with at least two subclusters of the main cluster of points and creating position determination assisting data comprising a relation between the cell relation configurations and the associated area definitions.

In a fourth aspect, a node of a cellular communications network comprises an arrangement according to the third aspect.

In a fifth aspect, a cellular communications network comprises an arrangement according to the third aspect.

In a sixth aspect, a computer readable medium comprises position determination assisting data provided by a method according to the first or second aspect.

Among the numerous advantages of the present invention can be mentioned the following: A database of area definitions for cell relation configurations are built up adaptively and automatically. The splitting of clusters into subclusters increases the obtainable positioning accuracy. The performance of the UTDOA and A-GPS positioning methods can be improved by initial positioning data obtained by the present invention. The area definition information is automatically refined, a fact that is useful e.g. when parts of the Radio Network (RAN) is re-planned.

BRIEF DESCRIPTION OF THE DRAWINGS

The invention, together with further objects and advantages thereof, may best be understood by making reference to the following description taken together with the accompanying drawings, in which.

DETAILED DESCRIPTION

In the present disclosure "position determination assisting data" is used to define data that is used in cell-related activities in cellular communications system, such as radio network planning or positioning based on cell-ID. In particular, it may refer to the cell relation configuration and related area definitions used in the present disclosure. This should not be mistaken for "assistance data", which in the present disclosure is used solely in A-GPS discussions.

In the present disclosure, WCDMA systems are used as a model system. However, anyone skilled in the art realizes that the basic principles of the present invention are applicable also to other cellular communication system, such as GSM. The invention is thus not limited to the exemplifying embodiments as such.

Figure 1:
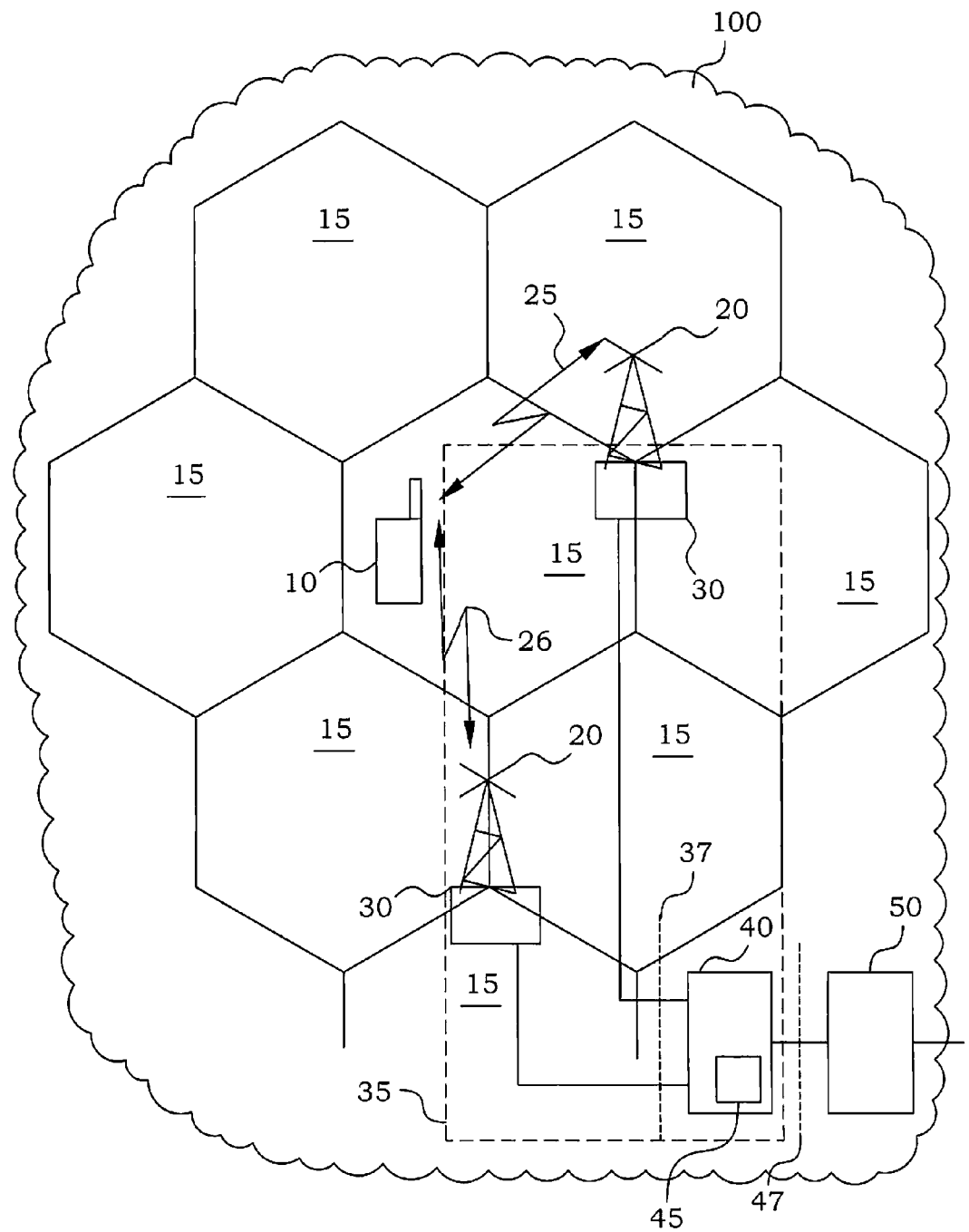
FIG. 1 is an illustration of a cellular communications system.

FIG. 1 illustrates a general WCDMA system 100. Radio base stations 30 (RBS) are spread over the coverage area of the system and serves antennas 20, which in this embodiment are sectorized antennas. A cell 15 is associated with each sector of the antennas 20, as the area in which connection to the communications system preferably is performed through that particular sector. The RBSs 30 are connected to a Radio Network Controller (RNC) node 40, which in a typical case comprises a positioning node 45. The UEs 10 and the RNC 40 communicates over the so-called RRC (Radio Resource Control) interface 37 that is transparent to the RBS 30. The RBSs 30 and the RNC 40 are nodes comprised in the UTRAN (Universal Mobile Telecommunication System Radio Access Network) 35. The RNC 40 is further connected to the Core Network (CN) 50 of the communications system 100 via a RANAP (Radio Access Network Application Part) interface 47.

A user equipment (UE) 10 is situated in the area covered by the cellular communications system 100. The user equipment communicates with the own radio base station 30 through signals 25. However, also signals 26 from and to neighbouring RBSs 30 may be possible to detect. If the neighbouring signals 26 are strong enough for supporting actual communication, the corresponding cell could be included in a so-called active set of cells, which participates in soft(er) handover. (By soft handover is meant the case where two different non-colocated RBSs are used, whereas softer handover refers to one RBS with several sectors.) A special case is when the UE is connected to two sectors of the same RBS, i.e. softer handover. However, for the purpose of the present invention, there is no substantial difference between soft and softer handover and both cases can be handled analogously. The signal 26 may in some cases be too weak to be included in the active set, but strong enough to allow for identification of the transmitting RBS. Such signals may e.g. be used for positioning purposes. Finally, neighbouring signals 26 may also be too weak to enable any use at all.

When a UE 10 is connected to a certain RBS via certain radio links, the UE 10 is likely to be situated within the associated cell. The cell area, in WCDMA defined by a polygon that describes the cell extension, is normally not determined with the best possible accuracy. with respect to the true extension of the cell. The approximate cell area is typically determined in connection with cell planning and may not correspond perfectly to the real situation. Normally, the actual confidence level, i.e. the probability that the UE is actually located within the specific area, of the cell area extension is not specified. Furthermore, radio conditions may also be altered after the cell planning has been preformed. It would therefore be advantageous to tune the confidence and the pre-calculated cell polygon for each cell, using field data. This can normally not be afforded though. in particular since the radio conditions may change with time. The present invention disclosure reveals a way to obtain such tuning automatically, also for complex shapes.

Figure 2A:
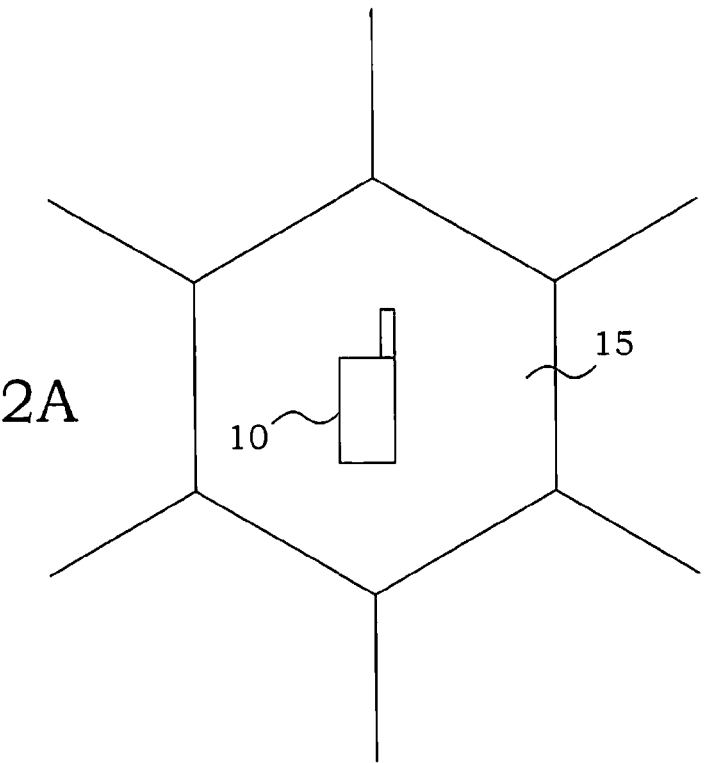
FIGS. 2A-E are illustrations of examples of division of a cell into smaller areas according to coverage from neighbouring cell signals.

FIG. 2A illustrates a cell 15, with a UE 10 connected. For simplicity in the coming explanations, the RBS is in this case assumed to be placed at the centre of the cell, a so-called omni-cell configuration. When the UE 10 is connected to the RBS, it can with a certain probability be determined to be present within the cell 15.

Figure 2B:
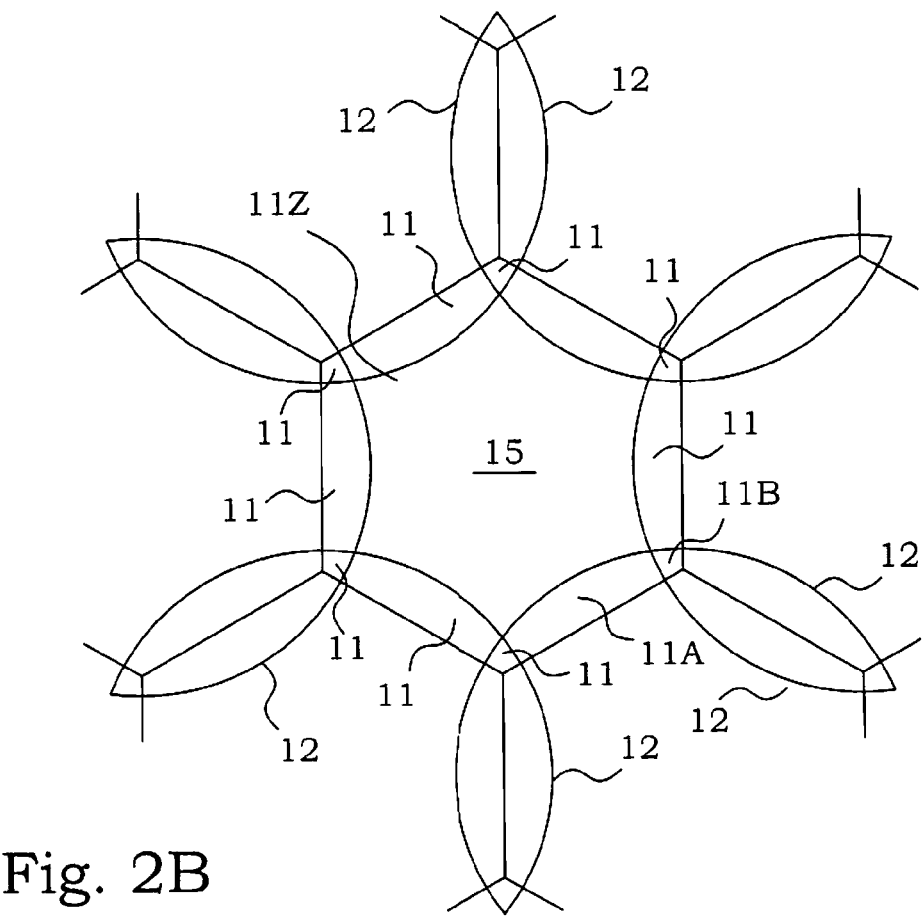

However, as mentioned briefly above, the UE may also be within radio range from other RBSs as well. In FIG. 2B, borders 12 of areas within which signals to/from a neighbouring RBS are strong enough to allow for soft(er) handover are indicated. In this oversimplified model, the borders 12 are drawn as circles, having their centre at a neighbouring RBS. It is easily seen that the borders 12 divide the cell 15 into smaller areas 11, 11A, 11B, 11Z. In the area 11Z, only signals from the own RBS 30 are useful. However, in e.g. area 11A, signals to/from one neighbouring RBS are also useful for soft(er) handover purposes and are thus included in the so-called active set of cells. In area 11B, signals to/from two neighbouring cells are strong enough and the active set then comprises two neighbouring cells. It can now easily be understood, that the content of the active set can be used for positioning purposes. By consulting the active set list, it can be determined in which of the part areas 11, 11A, 11B, 11Z, the UE 10 is likely to be situated.

However, most often, soft(er) handover information is not used for positioning purposes, probably since it is likely to be difficult to compute with a sufficient accuracy. According to the present invention, area definitions that describe any soft(er) handover regions are useful. In WCDMA, such area definitions can conveniently be polygon definitions. However, using prior art cell planning principles would normally not provide area definitions determined with the best possible accuracy, with respect to the true extension of any soft(er) handover regions. Furthermore, the confidence value of any soft(er) handover regions would normally, using prior art methods, not be determined with the best possible accuracy, with respect to any calculated soft(er) handover area. It would therefore be advantageous to tune the confidence and the pre-calculated cell polygon for each cell, using field data. This can normally not be afforded though, in particular since the radio conditions may change with time, even more than for the basic cell. However, the present invention reveals a way to obtain such tuning automatically.

Signals from neighbouring RBSs can be utilized further. As mentioned above. even if the signals to and from neighbouring RBSs are not strong enough for allowing soft(er) handover, they may still be strong enough to enable determination of the identity of the transmitting RBS/UE.

Figure 2C:
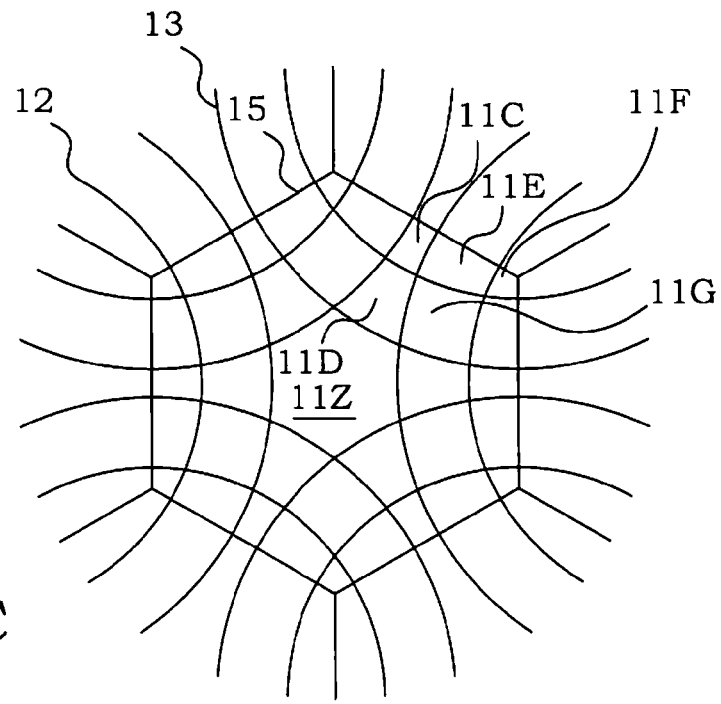

Corresponding set of cells is typically referred to as the detected set of cells. Also this information can be used for positioning purposes. In FIG. 2C, the cell 15 is once again illustrated. Now, not only borders 12 for soft(er) handover (of which only one is denoted by a reference number) are illustrated, but also borders 13 of areas in which the identity of the transmitting RBS or UE can be obtained in downlink or uplink, respectively, e.g. corresponding to the detected set of cells. The cell 15 is thereby further divided in even smaller part areas 11, 11C-G, 11Z. For instance, in area 11E, signals from one neighbouring RBS are, besides the signals from the own RBS, used for soft(er) handover, while signals from another neighbouring RBS only are used for identifying the transmitting RBS.

Figure 2D:
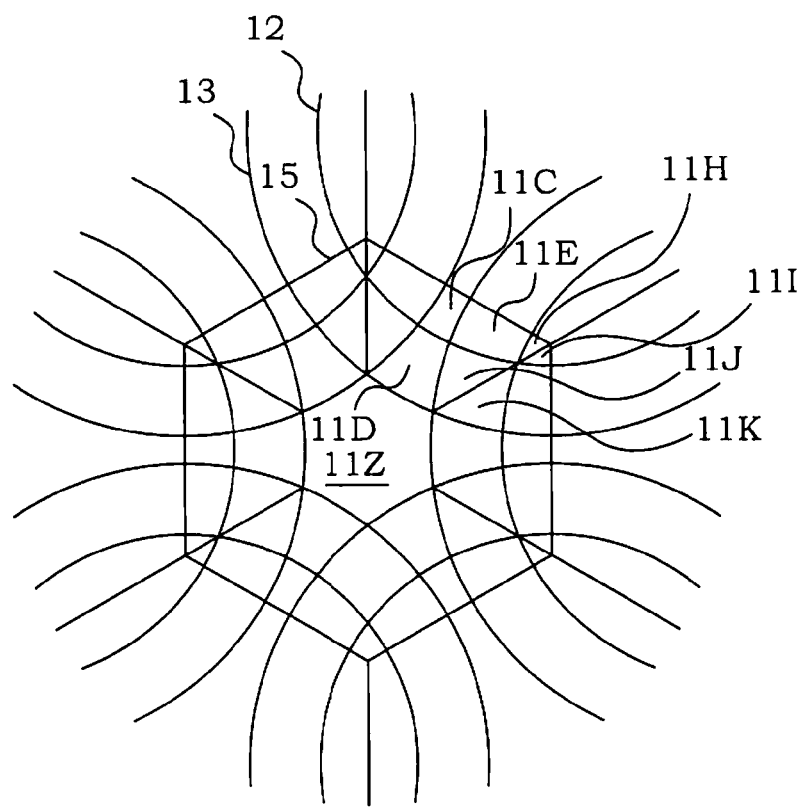

If not only the existence of signals of certain strengths are considered, but also the relative strengths as compared to other signals, an even finer division of the original cell can be achieved. In FIG. 2D, the part areas that involves signals from more than one neighbouring RBS are divided according to which signal that is the strongest. Areas 11H-K are thereby possible to define.

Figures 2E, 3A, 3B, 3C:
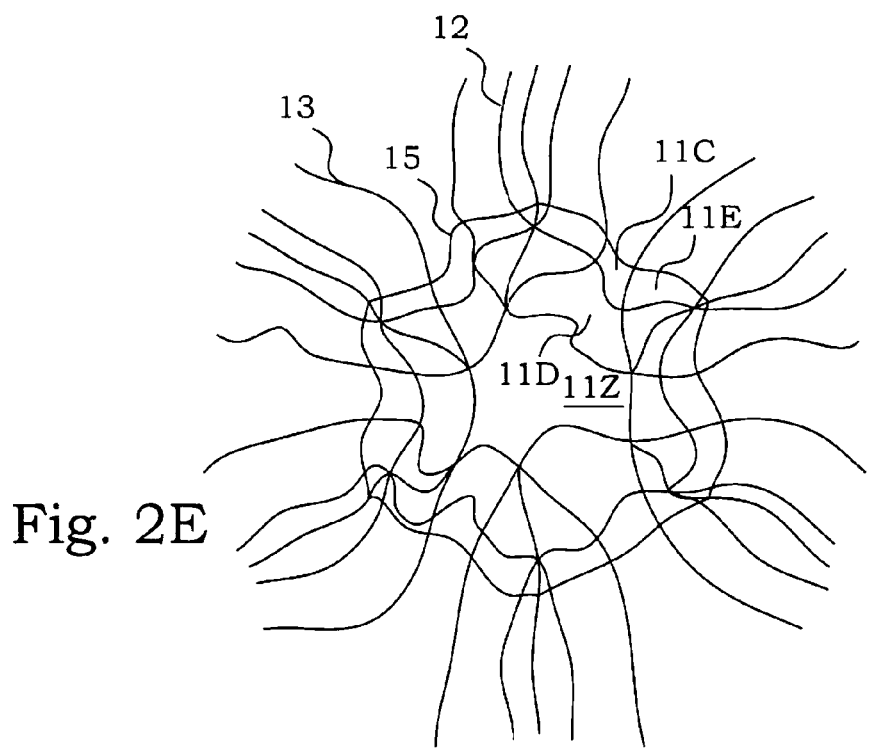
FIGS. 3A-C are illustrations of examples of cell relation configurations.

As mentioned above, the real situation is, however, not so ideal as the examples of FIGS. 2A-D may indicate. Instead, the borders 12, 13 are not easily determined and are typically non-circular. FIG. 2E illustrates a situation that could correspond to a real situation. Anyone skilled in the art then realises that any theoretical pre-determination of the areas 11, 11A-K, 11Z, is impossible in practice.

In the present invention, two types of information are connected to each other in order to achieve positioning advantages: cell relation configuration and high-precision positioning data.

The first type of information is a cell relation configuration. This cell relation configuration corresponds to the divisions in the previous examples of FIG. 2A-E. The cell relation configuration comprises in a basic embodiment data representing the "own" cell as well as any neighbouring cell, in which the RBS corresponding thereto transmits/receives detectable signals to/from the user equipment in question which fulfill a certain criterion. In a typical view. the cell relation configuration can be considered as a list of cell identities corresponding to signals fulfilling a specific radio condition criterion with respect to a certain UE. FIG. 3A illustrates an embodiment of such a list. The first row corresponds to the own cell. The cell ID is "ID1". The UE can in this example also communicate with cells "ID2", "ID3", "ID4", "ID5". Each combination of cells will in this embodiment define a particular cell relation configuration.

FIG. 3B illustrates another embodiment of a cell relation configuration. Here, the relative signal strengths are taken into account, and the cells are thereby sorted in strength order. A signal to/from cell "ID3" is thereby stronger than signals to/from e.g. cells "ID5". This means that a cell relation configuration in this embodiment is not only dependent on which cells that are comprised in the list, but also in which order. There may even be a difference in strength order between uplink and downlink, which also can be utilised in defining areas.

Also other signal-strength related quantities can be utilised for defining the cell relation configuration, e.g. path loss and signal-to-interference ratio.

FIG. 3C illustrates another embodiment of a cell relation configuration. Here, the signal strengths are also classified. It can be seen that cell "ID1" is classified as "the own cell", and cells "ID3" and "ID5" are classified to be comprised in the active set of cells, i.e. they are utilised for soft(er) handover purposes. This means that a cell relation configuration in this embodiment is not only dependent on which cells that are comprised in the list and in which order, but also on the classification of the cells.

In the view of the above examples, anyone skilled in the art realizes that a cell relation configuration is easily obtainable for any UE that is situated within a coverage area of a cellular communications network.

The second type of necessary data is as mentioned further above high-precision positioning data. This can be derived in any possible way. UTDOA and A-GPS are mentioned earlier in the background, but other methods can be useful as well. The idea is to collect relations between high-precision positioning data and cell relation configuration for the corresponding UE at the positioning instant. This is preferably performed by using measurements of opportunity, i.e. high precision measurements that would anyway be performed for some other reason. Alternatively, the measurements could be arranged on purpose. For instance, e.g. for the purpose of improved radio network planning, high-precision position measurement devices could be spread over a certain area in a planned manner. Positions are determined as well as cell relation configurations. Another alternative could be to regularly order user equipment capable of high-precision positioning to provide such measurements. For each possible cell relation configuration (i.e. in a simple view set of ordered cell identities), a measurement list is then setup. All high-precision measurements that are related to a specific cell relation configuration are then collected in one specific list of high-precision measurements. In other words, the high-precision positioning data are clustered dependent on the prevailing cell relation configuration, giving rise to a number of main clusters of points. The points correspond to the positions determined by the high-precision measurement, and the clusters are defined in terms of prevailing cell relation configuration of the terminals performing the high-precision measurements. The measurements of one such list thus form a main cluster of measurements of points that can be expected to be located in a specific geographical area. The clustering of results of the high-precision position determinations thus gives a number of separate main clusters of points. When a suitable number of high-precision positioning data points are clustered in one of the separate main cluster of points, it is possible to define an area which contains a pre-determined fraction of the high-precision positioning data points. It can then be concluded that a UE having a certain cell relation configuration is situated within the defined area with a confidence level corresponding to the pre-determined fraction.

In other words, a UE that not by itself has any high-precision positioning capabilities may utilise previous high-precision positioning of other UEs for achieving an improved accuracy in position determination by association to the prevailing cell relation configuration.

It can be noticed that the achieved area definitions can be considerably different than the actual radio coverage. The reason is that areas having good radio conditions but never hosting any user equipments will tend to be excluded from the determined area. The associated area will instead be an area based on a combination of radio coverage properties and probability for user equipment occurrence.

Due to the connection with the probability for user equipment occurrence, the ideal associated areas can become fairly complex. In particular, there may e.g. be areas having a high local density of points separated by areas having a very low local density of points. A single associated area must then also include areas having a relatively low local density of points. This in turn leads to the fact that the associated area becomes larger than necessary. for covering a predetermined fraction of the points. A larger area means a lower positioning accuracy. This problem can, however, be solved. According to the present invention, a main cluster of points is divided into subclusters, based on a local density of points. Each subcluster is associated with a subarea. The area associated with the main cluster then becomes the aggregate of the subareas. In other words. the ideal associated area may be an area composed by two or more separated subareas. This is described more in detail further below.

The general ideas of the clustering approach can also be illustrated by a flow diagram of the main steps of an embodiment of a method for providing position determination assisting data in a cellular communications network, illustrated in FIG. 4A. The procedure starts in step 200. The procedure first comes to a section 202 for providing position determination assisting data. This section starts with a step 204, in which a cell relation configuration for a particular UE is determined. The signals are typically registered and reported according to standard cellular communication system procedures and compiled to cell relation configuration. In step 206, a high-precision positioning of the UE is performed, using any suitable high-precision positioning method. In step 208, the high-precision positioning data is clustered dependent on the determined cell relation configuration into separate main clusters of points. Examples of this are described more in detail further below. The separate main clusters of points can in turn be divided into subclusters. Details of preferred embodiments separating the main clusters of points into subclusters are given further below. The steps 204 to 208 are repeated a number of times, as indicated by the arrow 210.

When an appropriate number of measurement points are available for a certain cell relation configuration, the procedure may continue to step 212, in which an area is determined, which resembles the spatial distribution of the high-precision positioning data. Preferably, an area as small as possible is computed, which still contains a pre-determined fraction of the high-precision positioning data. Details of preferred embodiments are given further below. A relation between a certain cell relation configuration and an area definition is thereby achieved. If further data is added by the steps 204-208, the step 212 may also have to be repeated as indicated by arrow 214. In particular, if the radio conditions are changing, permanently or for a longer period of time, the area definitions have to be re-calculated and adapted to the new situation. Each high-precision position measurement is then also preferably time stamped in order to make it possible to discard high-precision position measurements that are too old, and successively performing new area optimizations.

The step 212 can be performed for one particular cell relation configuration, a group of cell relation configurations or all cell relation configurations as well as for different clustering selection criteria.

The lists of measurements are preferably organized hierarchically so that lists at higher levels can be constructed from lower levels in case the number of measurements at lower (more detailed) level would be insufficient for a reliable computation of a cell polygon.

The driving force behind the present invention is not primarily troublesome problems with existing technology, rather an insight that performance e.g. of the Adaptive Enhanced Cell Identity (AECID) algorithm can be further improved by means of the invention disclosed in the present invention disclosure.

Figure 4:
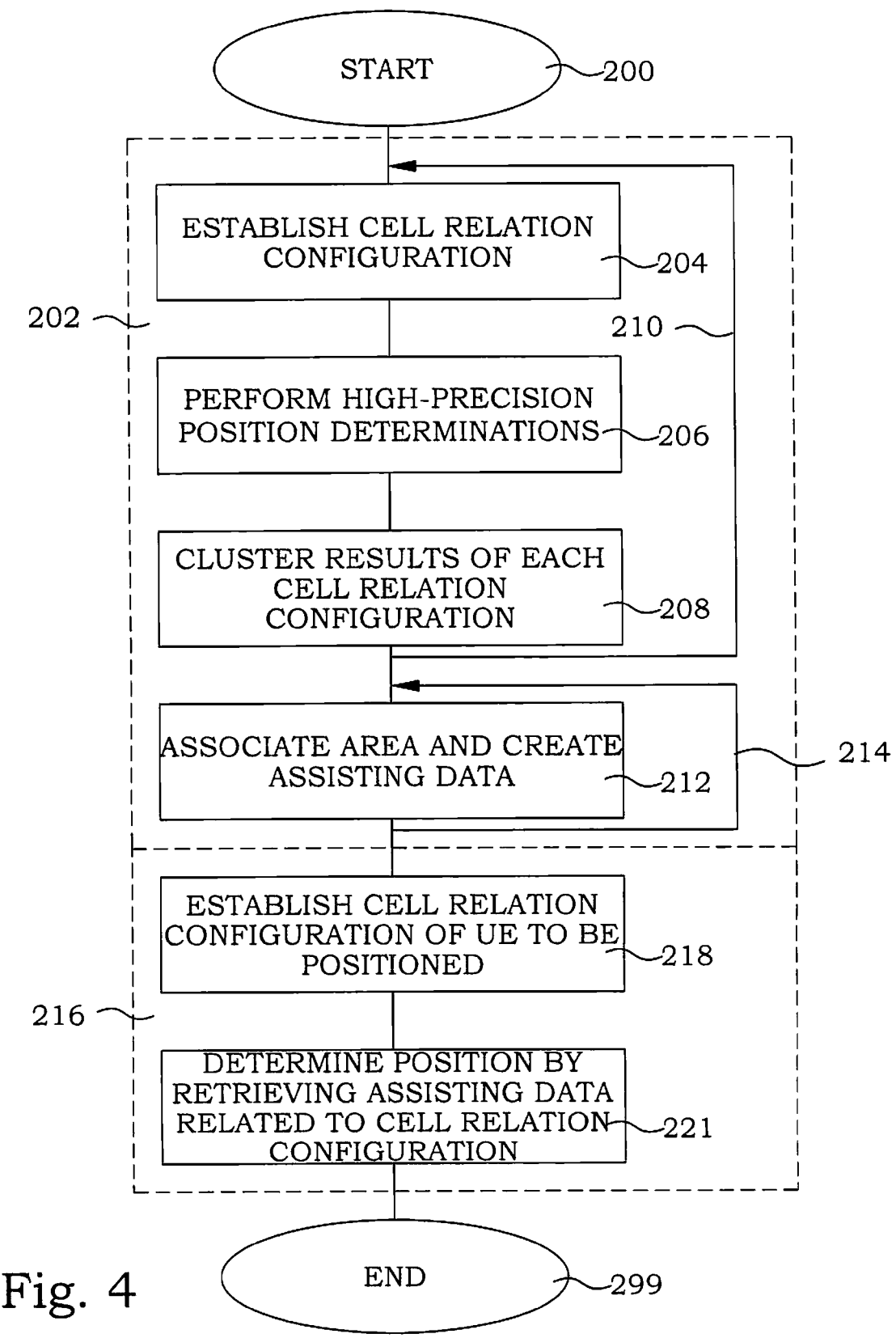
FIG. 4 is a flow diagram of steps of an embodiment of a method according to the present invention.

The focus of the invention is on improvements of the state of the art algorithm for clustering in AECID, i.e. connected to step 208 of FIG. 4. The improvements will also to some extent influence step 212. The basic algorithm in normal AECID operates as presented in Appendix A.

The algorithm hence generates one separate main cluster of measurements, for each tag, or equivalent in other words, one separate main cluster of points for each cell relation configuration. In situations where the points of a main cluster are distributed in such a manner that they are situated relatively frequently within one well connected area, the procedure may proceed to the association step.

However, in situations where the majority of the points of a main cluster are located to several distinct locations, further improvements in terms of accuracy are possible. according to the present invention. An important feature is to allow generation of multiple smaller clusters, or subclusters, form one large main cluster. The area association is then preferably performed collectively to areas optimized for each subcluster.

A typical situation where clustering into several distinct locations is likely to occur may be when a cell comprises several distinct locations with high probability for UEs to be present, separated by areas in which UEs almost never enter. A couple of shopping malls separated by stock-room areas where non-authorized persons are prohibited can be one example. Another example is a number of heavily used freeways separated by non-used areas.

According to the present invention a method for clustering position determinations for providing position determination assisting data in a cellular communications network is provided, allowing generation of subclusters. The method requires that a main cluster of points is available, which points are the results of high-precision position determinations, preferably for a particular cell relation configuration. The main cluster of points can be obtained from an external party or can be obtained by clustering, e.g. according to the above description. The method comprises separation of the main cluster into at least two subclusters in such a way that the points in the subclusters have a local density of points above a predetermined local density threshold. Preferably the method also comprises determination of a local density of points for each point in the main cluster of points.

The present novel algorithms for splitting of a cluster of high precision position measurement into multiple smaller clusters, enables an enhancement of the accuracy of the AECID positioning method. The AECID is allowed to create multiple polygons per tag. The finer division makes it possible to optimize the corresponding areas better, which means that the multiple polygons per tag taken together cover a smaller total area than would a single polygon, corresponding to the original cluster.

Post-processing algorithms are preferably included allowing for detection and suppression of degenerated cases, and resulting clusters of insignificant size. The splitting the original cluster thus takes place only in situations where the majority of the high precision position measurements are located in geographically distinct regions. This allows the complete algorithm to operate in autonomous mode.

Some examples where AECID clustering can be expected to allow splitting of a main cluster were presented above. Other examples are e.g. hilly terrain, in which cellular coverage can be expected to be located on slopes oriented towards the antenna of a specific cell, with reduced coverage in valleys between slopes. This would affect the cluster via failures in tagging high precision measurements according to proper cell relation configurations. This may therefore result in a lack of correctly tagged high precision position measurements in certain regions.

Terrain that prevents users from being located in certain areas, e.g. when cell coverage extends over a wide river, or several islands in archipelagos, is another example where the present ideas would be particularly advantageous. The properties of the terrain would affect the cluster of high precision directly, since essentially no high precision positioning attempts will be initiated in the areas where users cannot be located. Subclusters may in such a case exclude such areas from being presented as possible AECID positions.

In certain cases, there are separate coverage regions of a cell in front of and behind an antenna. Subclusters covering each region will then give a better AECID positioning.

The actual effect of the splitting of main clusters in several smaller subclusters, with the same tag of cell relation configuration, is an exclusion of uninteresting parts of the regions of the initial un-split cluster. The areas computed by AECID for the subclusters would then, summed up, cover a smaller area than an area computed from the original, un-split main cluster. The key point is that the reduced area results in an enhanced accuracy, when reported back over the service interface.

The purpose of the algorithm that is to be described is to attempt and, if possible, find a division of the original main cluster into a set of smaller subclusters that cover distinct regions of the original main cluster, at the same time as the subclusters contain a sufficiently high fraction of the points of the original main cluster.

Figure 5:
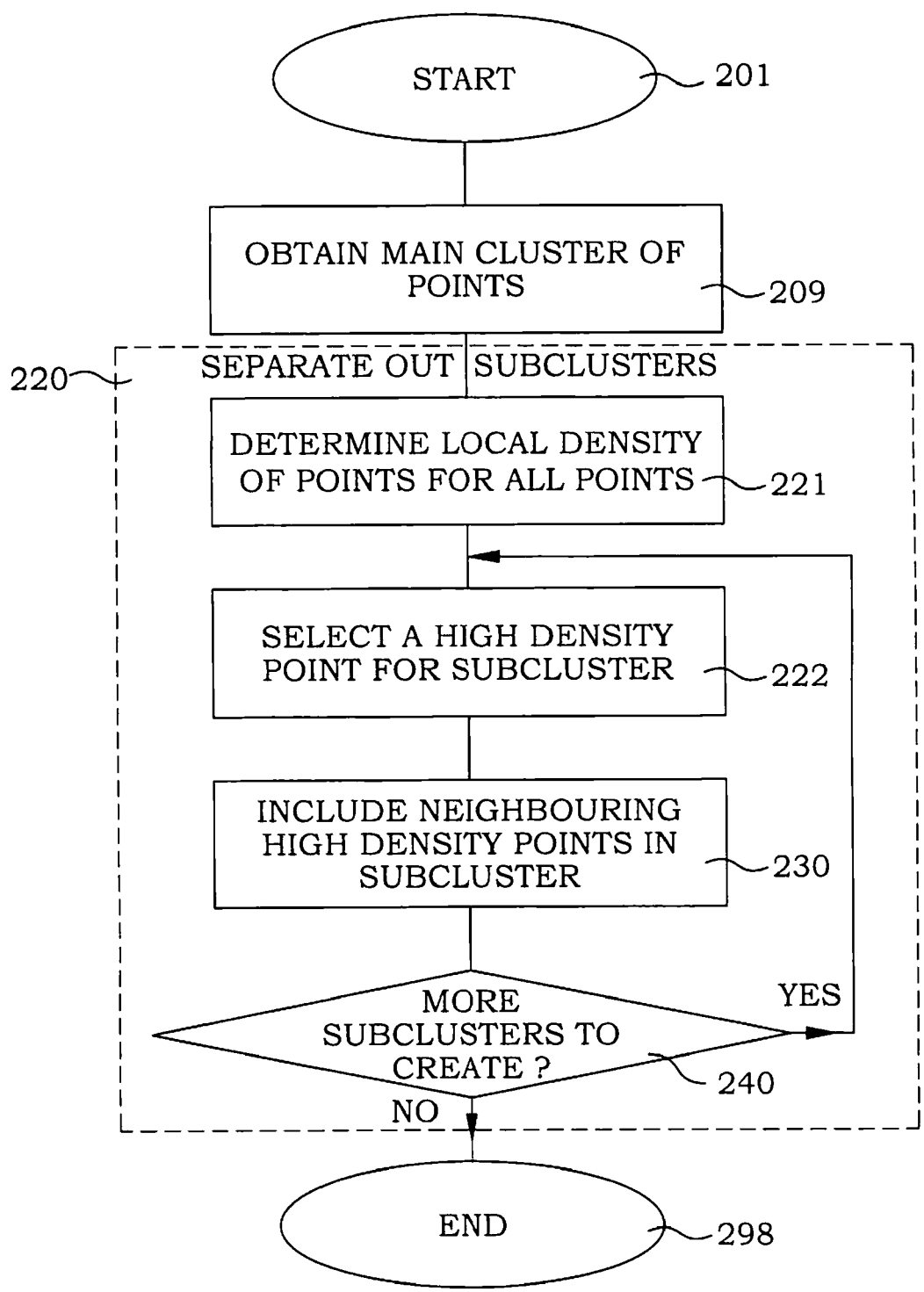
FIG. 5 is a flow diagram of steps of an embodiment of a method according to the present invention.

In a presently preferred embodiment, the splitting into subclusters is based on an initial selection of an original point from which the subcluster gradually evolves. FIG. 5 illustrates a flow diagram illustrating steps of an embodiment of a method for clustering position determinations for providing position determination assisting data in a cellular communications network. The method begins in step 201. In step 209 a main cluster of points is obtained. At least two subclusters are separated out in step 220. The points of the subcluster have a local density of points above a predetermined local density threshold. In the present embodiment, step 220 comprises a number of part steps. In step 221 a local density of points for each point in the main cluster of points is determined. Such a determination can be performed in different ways. A typical procedure to use is to define a measure of the "local" area, e.g. a radius around the point and determine an average density of points within such local area. One embodiment is given in Appendix B in a mathematical language.

Within step 220, in step 222, a point in the main cluster of points is selected to be included in a subcluster. That point has a local density of points that is larger than the predetermined local density threshold. In step 230, points of the main cluster of points are included in the first subcluster. These included points have a local density of points that is larger than the predetermined local density threshold. In one embodiment described further below, the points to be included should also have a distance to any other point included in the subcluster that is smaller than a predetermined distance threshold. Details of embodiments of step 230 are given further below.

In step 240, it is checked whether there are more subclusters to be formed. If that is the case, the procedure returns to step 222 again. The points selected to be included in a subcluster are excluded from being included in a subsequent formed subcluster. In other words, the point being selected in step 222 for a subsequent, n:th, subcluster, where n>1, has a local density of points that is larger than the predetermined local density threshold and is not included in any of the (n−1) previous subclusters. Likewise, in step 230 for a subsequent, n:th, subcluster, points of the main cluster of points are included. The included points have a local density of points that is larger than the predetermined local density threshold and is not included in any of the (n−1) first subclusters. In one embodiment described further below, the points to be included should also have a distance to any point included in the n:th subcluster that is smaller than the predetermined distance threshold. The predetermined local density threshold and/or the predetermined distance threshold are in one embodiment the same for all subclusters. However, in other embodiments, the predetermined local density threshold and/or the predetermined distance threshold may differ between different subclusters.

The criterion for creating more subclusters may differ between different embodiments. One approach is to have a maximum number N of allowed subclusters, whereby the steps 222 and 230 are repeated until N subclusters are formed. If no more subclusters can be formed using the criteria of the predetermined local density threshold and the predetermined distance threshold, there is an alternative to lower the requirements for obtaining the last subclusters. Remaining points of the main cluster not being included are typically discarded. Another approach is to continue until no more subclusters can be formed using the criteria of the predetermined local density threshold and the predetermined distance threshold. These two approaches can also be combined, i.e. forming subclusters according to the original criteria, but having a maximum allowed number of subclusters.

The procedure ends in step 298.

Figure 6:
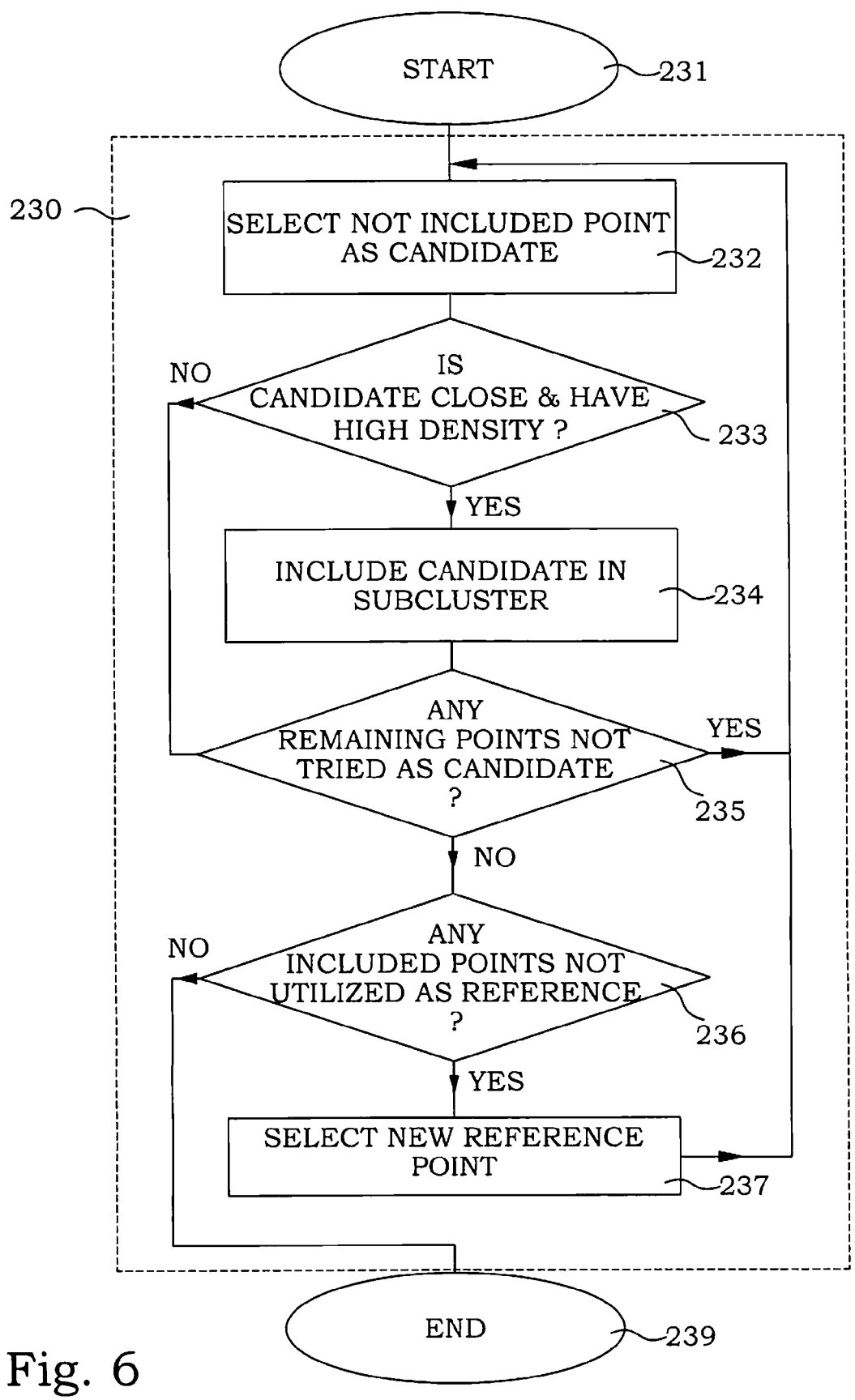
FIG. 6 is a flow diagram of the steps of an embodiment of step 230 of FIG. 5.

The inclusion of further points into a subcluster can be performed in different ways. One approach to include further points into a subcluster is illustrated in FIG. 6. The procedure starts in step 231. Here the point selected in step 222 (FIG. 5) is denoted as a first reference point. In step 232, a point of the main cluster of points that is not yet included in the subcluster is selected as a candidate point. In step 233, it is checked if the candidate point has a local density of points that is larger than the predetermined local density threshold and has a distance to the reference point that is smaller than the predetermined distance threshold. If that is the case, the procedure continues to step 234. Otherwise the procedure continues to step 235. In step 234, the candidate point is included in the subcluster. In step 235, it is determined if there are any remaining points not yet tried as a candidate point. In such a case, the procedure returns to step 232. In other words, the checking of candidates continues until no further point remains, that is not included in the subcluster have a local density of points that is larger than the predetermined local density threshold and have a distance to the reference point that is smaller than the predetermined distance threshold.

If all points have been tried as candidates, the procedure continues to step 236, where it is determined whether all points included in the subcluster has been utilized as reference point. If that is the case, the procedure continues to step 239, otherwise, if there are remaining points included in the subcluster that has not been utilized as reference point, the procedure continues to step 237. In step 237, a new reference point is selected among points in the subcluster that has not previously being selected as a reference point, and the procedure starts all over again with step 232. The procedure ends in step 239.

A mathematical description of another embodiment of a subcluster selection procedure is also given in Appendix C. This embodiment operates on $(x_i^p\ y_i^p)^T$, i=1, . . . , $N^p$, which denote the high precision measurements of the original cluster with tag p. The points are assumed to be represented in a local Cartesian earth-tangential co-ordinate system, i.e. not as WGS 84 latitudes and longitudes.

Figure 7:
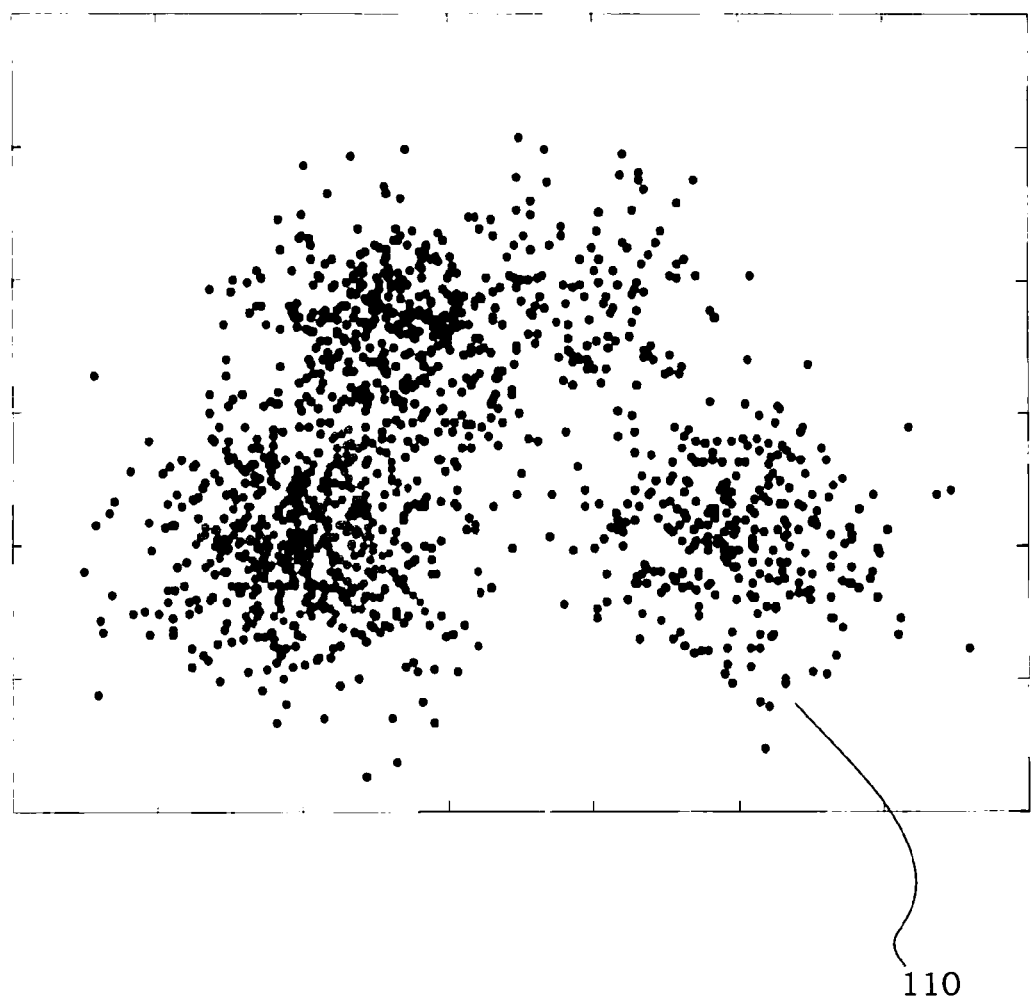
FIG. 7 is an illustration of an example of a distribution of points in a main cluster of points.

The cluster splitting algorithm attempts to solve the problem with highly heterogeneous areas by repeated subclustering attempts, applied to the points of the original main cluster. A specific criterion is used to stop each subclustering attempt. The local density of points is useful as a stopping criterion. FIG. 7 illustrates a graph illustrating an original tagged main cluster 110 of high precision position measurements, i.e. high precision position measurements having the same cell relation configuration.

In FIG. 7, it is obvious for anyone skilled in the art that at least 2, possibly 3 separate regions with a significantly higher local density of points exist. These regions are all candidates for becoming separate subclusters. The high local density regions are separated by regions where the local density of points is significantly lower than in the high local density regions. The algorithm of Appendix C exploits this fact by starting a build-up of a subcluster in a selected high local density point. The algorithm then proceeds to add the geographically nearest neighbour to the subcluster. The algorithm proceeds by repeating this stepping to the next nearest neighbour until the local density of the nearest neighbour point becomes too low. The algorithm then steps back to one of the points already added to the subcluster, and initiates a new search for nearest neighbours. This time nearest neighbours already added to the subcluster are excluded. The algorithm proceeds by repeating this search for nearest neighbours until all current points added to the subcluster has been used as starting points for a nearest neighbour search. The algorithm stops when no more points are added to the subcluster, or when all points of the original main cluster has been added to the subcluster.

It is clear that in order for the procedure to work efficiently, a local density of points need to be calculated, for each point of the original cluster, preferably according to Appendix B. Obviously, the low local density regions between high local density regions play the roles as "stopping regions" when a subcluster is built up. The build-up procedure ensures that a high number of different attempts are made to cross the "stopping regions", thereby preventing the creation of unnecessarily small subclusters.

When the build-up of one subcluster has been finalized, the algorithm repeats the attempt to create subclusters, using the points of the original main cluster that has not yet been consumed by previous buildup of subclusters.

Figure 8:
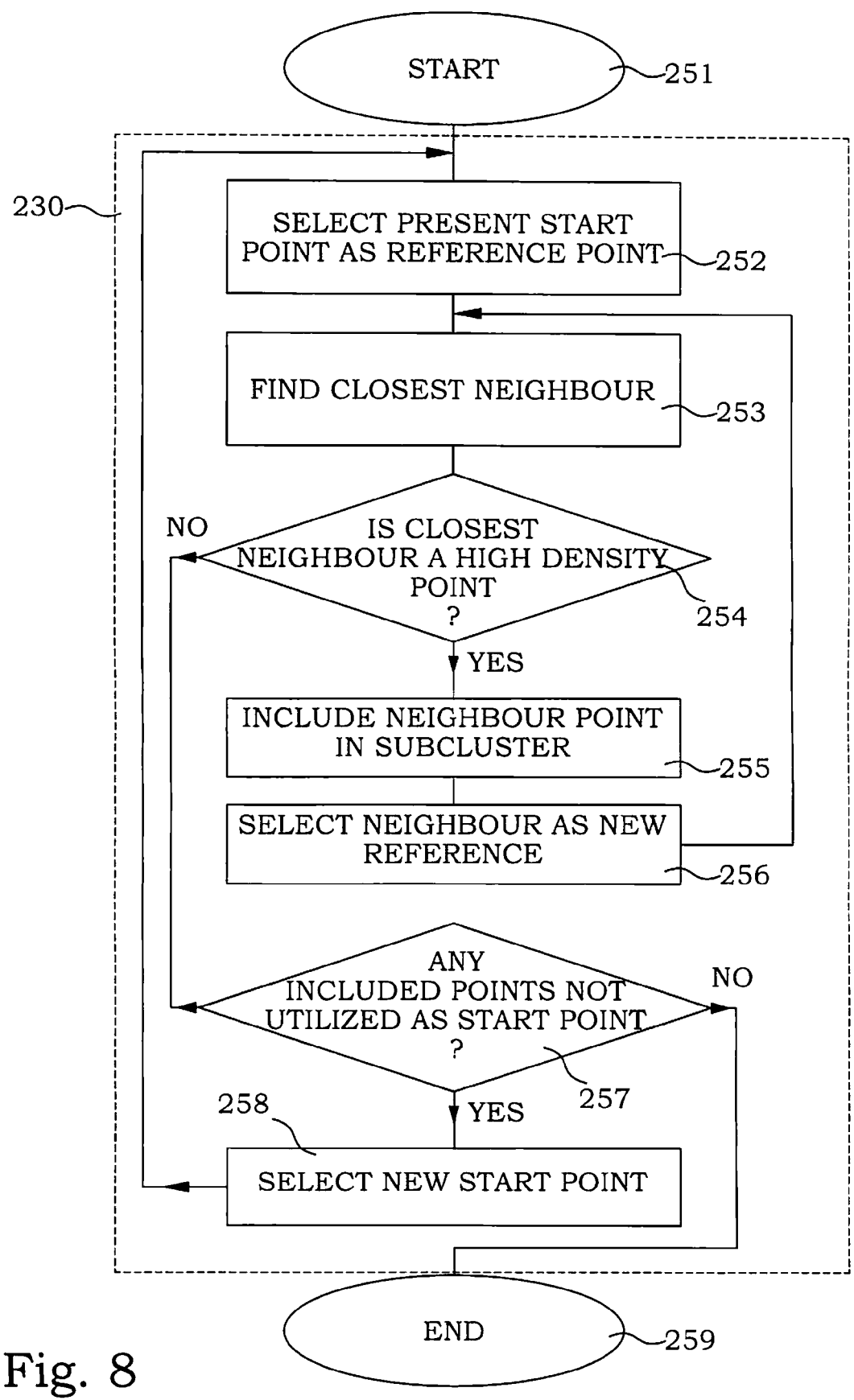
FIG. 8 is a flow diagram of the steps of another embodiment of step 230 of FIG. 5.

This approach is illustrated as a flow diagram in FIG. 8. The procedure starts in step 251. Here the point selected in step 222 (FIG. 5) is the point not yet included in any subcluster having the highest local density of points and is denoted as a first start point. In step 252, the start point is selected as a first reference point. In step 253, the closest neighbour point to the reference point that is not already included in any subcluster is found. In step 254 it is checked if the closest neighbour point fulfils the local density requirements. If so is the case, the closest neighbour point is included in the subcluster in step 255 and selected as a new reference point in step 256. The procedure then returns to step 253 for repetition of the search for the closest neighbour.

If the closest neighbour point in step 254 has a too low local density of points, the procedure continues to step 257, where it is determined if there are any points included in the subcluster that is not yet used as a start point. If this is the case, one of these points are selected in step 258 as a new start point and the procedure returns to step 252. Otherwise, the procedure ends in step 259.

In an alternative embodiment, the search for the nearest neighbour can also be connected to a maximum distance, in analogy with the embodiment of FIG. 6.

Post-processing algorithms are as mentioned above preferably included in certain embodiments or for certain applications. The reasons can be understood by referring to FIG. 9. Here, the main cluster 110 of points of FIG. 7 has been split into four subclusters 101-104 according to the principles of Appendix C. The following observations can be made with respect to FIG. 9. The subclusters 101 and 102 are correct. The subcluster 103 that surrounds the subcluster 101 is erroneous. However, it is easy to understand that such subclusters can result from "outer remnants" of high local density regions that are still dense enough to allow formation of a subcluster.

Very small subclusters, such as subcluster 104, with only a few points in it may also result, which obviously does not contribute in any essential degree to the positioning accuracy. Furthermore, isolated points of the original main cluster that are not contained in any subcluster are also present. This occurs frequently when the maximum number of subclusters produced by the algorithm is specified. Such isolated points are typically discarded.

In this case, there is hence a need for post-processing procedures that suppress subclusters that are too small and that suppress subclusters that circumvent other correctly obtained subclusters, i.e. removing encircling subclusters, either by further splitting or by discarding the subcluster. Details of embodiments of such tests are included in Appendix D. A procedure for suppressing too small subclusters is preferable based on discarding subclusters having less than a predetermined number of included points. The procedure for removing encircling subclusters comprises in one embodiment the step of comparing an average of the local density of points with a ratio between a total number of points included in the encircling subcluster and an area spanned by the points in the encircling subcluster. The procedure for removing encircling subclusters comprises in another embodiment the step of comparing an average distance between points included in the encircling subcluster and a center of gravity of the points included in the encircling subcluster with a minimum distance between any of the points included in the encircling subcluster and the center of gravity of the points included in the encircling subcluster.

As a final sanity check, it should also be checked that the total number of points in subclusters that pass the above mentioned post-processing procedures is sufficiently high, as compared to the number of points in the original main cluster p. In case the sanity check reveals that the total number of points in subclusters is too low, the threshold values used in the algorithms may be revised.

Figure 9:
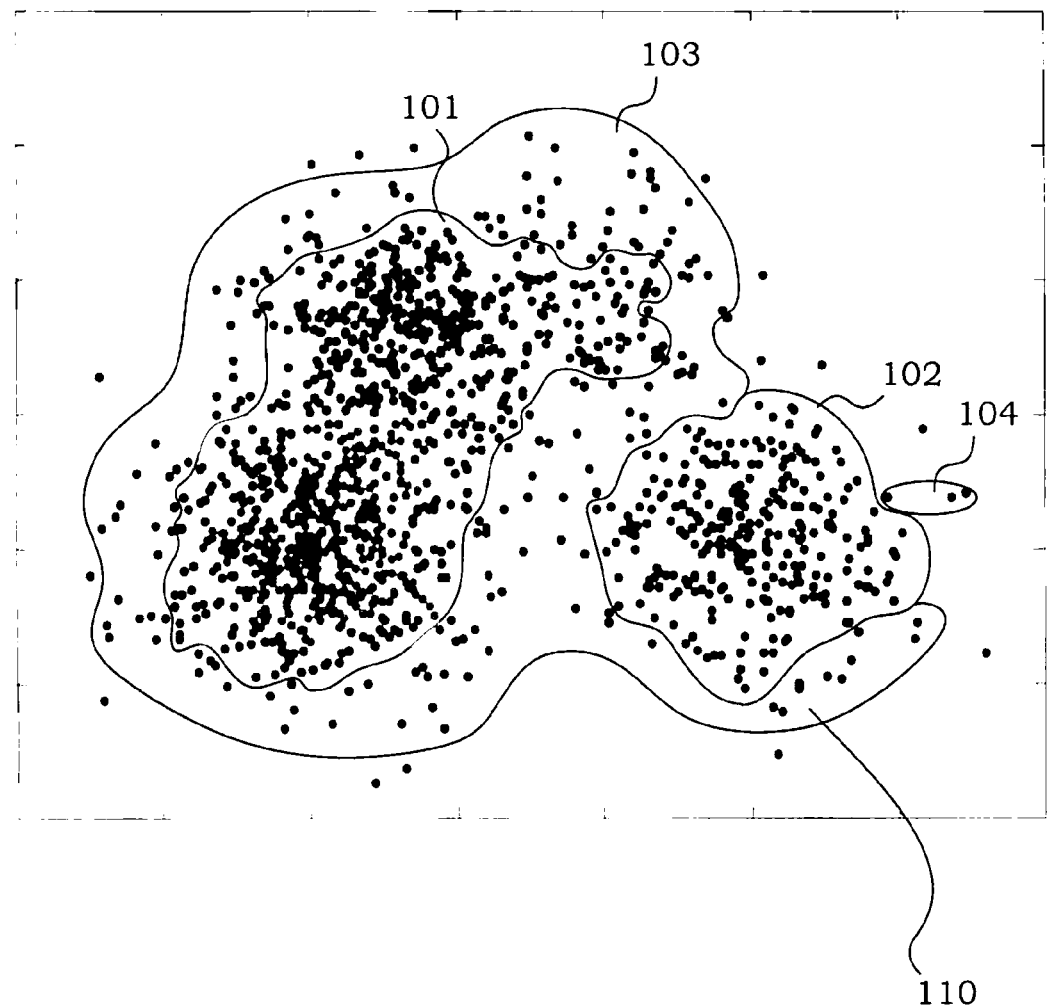
FIG. 9 is an illustration of an example of a distribution of points in a main cluster of points, split into subclusters.

In the example of FIG. 9, the following values were obtained for the number of points in each cluster, the values of the ratio (15) of the Appendix D and the final decision of the proposed algorithm:

TABLE 1

Numerical example of post-processing.

| Subcluster | No of points | Mean/min | Valid subcluster |
|---|---|---|---|
| 1 | 956 | 108.0212 | Yes |
| 2 | 263 | 68.3836 | Yes |
| 3 | 160 | 5.3286 | No |
| 4 | 3 | 1.8219 | No |

Above, clustering of the main clusters has been based mainly on active sets of base stations. However, the cell relation configuration can comprise other additional properties. The selection criterion for the clustering can thus also be made on other parameters. The Radio Access Bearer (RAB) could e.g. be one selection parameter. The coverage for different RABs can differ considerably, and the borders between different part areas can thereby change their position considerably. For instance, traffic transmitted by a 64 kbps link may have a completely different coverage area than traffic transmitted by a 384 kbps link. By also clustering the measurements e.g. with respect to the used RAB, will enable an improved positioning.

The information about the RAB is a type of auxiliary information about circumstances of signalling that makes the selection criterion more area selective. In a general approach, other auxiliary information can also be utilised in an analogue manner. Similarly, there are also auxiliary measurements of signalling properties that can be performed and used as a part of the selection criterion. An example is e.g. auxiliary RTF measurements, which is discussed further below. The selection criterion can be thought of as an augmentation of the cell relation configuration.

Now, returning back to the method for providing position determination assisting data in a cellular communications network of FIG. 4. When a UE is going to be positioned, the procedure enters into the section 216 for position determination. This section starts with a step 218, in which a cell relation configuration for the UE to be positioned is determined. This is typically performed in an analogue manner as in step 204. In step 221, the relation between a certain cell relation configuration and an area definition is used to provide an area in which the UE to be positioned is situated with a certain confidence. This confidence level corresponds to the pre-determined fraction used during the area optimization. The procedure ends in step 299. The accuracy of the positioning may in the best cases be enough for e.g. the North-American E-911 emergency positioning requirements. However, positions achieved in this manner should not be used to improve the area definitions according to the section 202.

The timing of the different steps can be somewhat differing in different embodiments. For instance, the two sections 202 and 216 may be interleaved with each other. The step of optimising the area 212 may then be triggered by the step of determining the cell relation configuration 218. The optimising step 212 is then preferably performed just for the cell relation configuration that was determined in step 218, in order to save time. If the relations are determined in advance, the positioning can be performed with a shorter delay. The latter embodiment having the optimization triggered by the need for positioning instead ensures that the latest available data always is utilized.

The position determined in step 221 can constitute the final positioning, or it can constitute assistance data for a refined positioning. Then, an extra step has to be included, where the position as achieved from the relation of step 221 is utilised in a further positioning method in order to refine the positioning further. Such further positioning methods can e.g. be RTT positioning or A-GPS positioning.

The time stamping can also be utilised in systems where the distribution of user equipments is likely to differ considerably between different times. For instance, if an office complex and a residence area are comprised close to each other, it is e.g. more likely to find the user equipments in the residence area during the nights. Such variations can be dealt with by discarding high-precision positioning data having a recording time of the day, of the week or of the year, that is considerably different from the present time. In other words, the clustering can be performed by only selecting measurements fulfilling a certain additional criterion. The area definitions can thereby be made time dependent.

Figure 10:
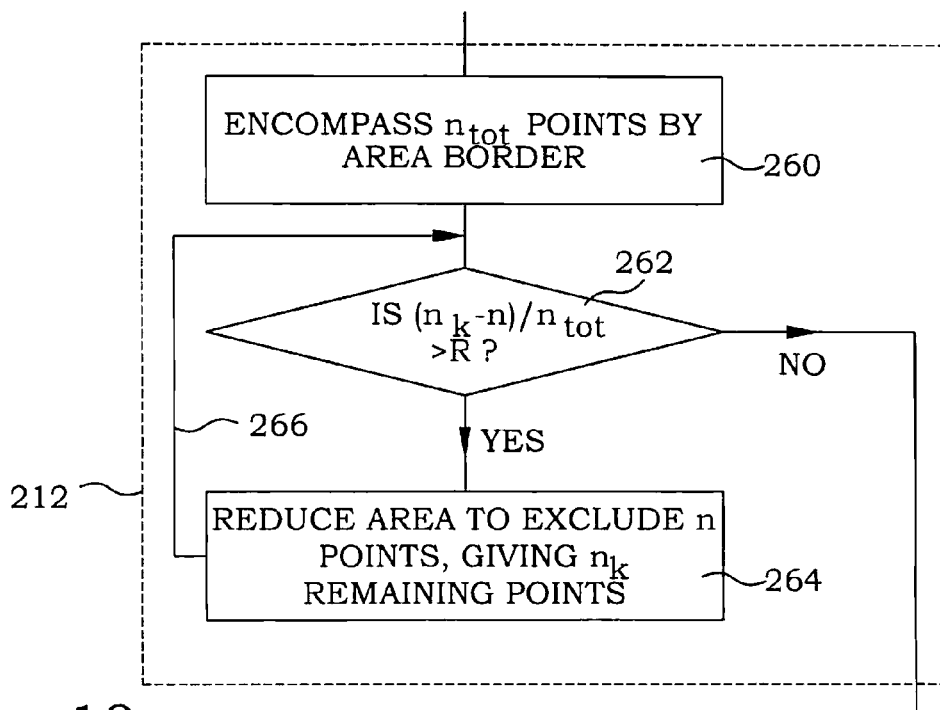
FIG. 10 is a flow diagram of steps of an embodiment of step 212 of FIG. 4.

The step of associating an area 212, preferably in an optimum manner, to the clusters is one of the more important parts of the positioning procedure. This area associating can be performed in many ways. but the exact implementation does not influence the main ideas of the present invention very much. However, some considerations may be taken. In FIG. 10, a presently preferred embodiment of determining an area associated with a cluster of points (main cluster or subcluster) is described more in detail. In step 260, all the high-precision measurement points, $n_{TOT}$, for the cluster in question are encompassed by an area border. $n_{TOT}$ is subsequently used as the inputted number of high-precision measurement points in the first iteration of the following step. In step 262, it is checked if the ratio $(n_k-n)/n_{TOT}$ is larger or equal to a predetermined fraction R, where n is the number of high-precision measurement points that is intended to be removed during the next iteration of the routine. If the ratio is large enough, the area reduction can proceed at least one step further, and the procedure continues to step 264. In step 264, the area is reduced according to a certain pre-determined action plan to exclude n of the inputted high-precision measurement points, leaving $n_k-n$ remaining points, which is set as the new inputted number of high-precision measurement points for the next iteration. Preferably, step 264 is performed in such a way that the area is minimized or at least reduced. The process returns to step 262 again, which is illustrated by the arrow 266. If the ratio in step 262 becomes smaller than R, the process is interrupted, since one iteration more would cause the ration to fall below R, and the area is subsequently used as the area associated with the cell relation configuration in question.

In case the cluster in question is a non-split main cluster, the procedure of FIG. 10 is performed once. If the main cluster is split into subclusters, as described above, the procedure is preferably performed for each subcluster separately. The total area associated to the original main cluster is then an assembly of the subareas determined for at least two of the subcluster and preferably for all non-discarded subclusters.

Figure 11:
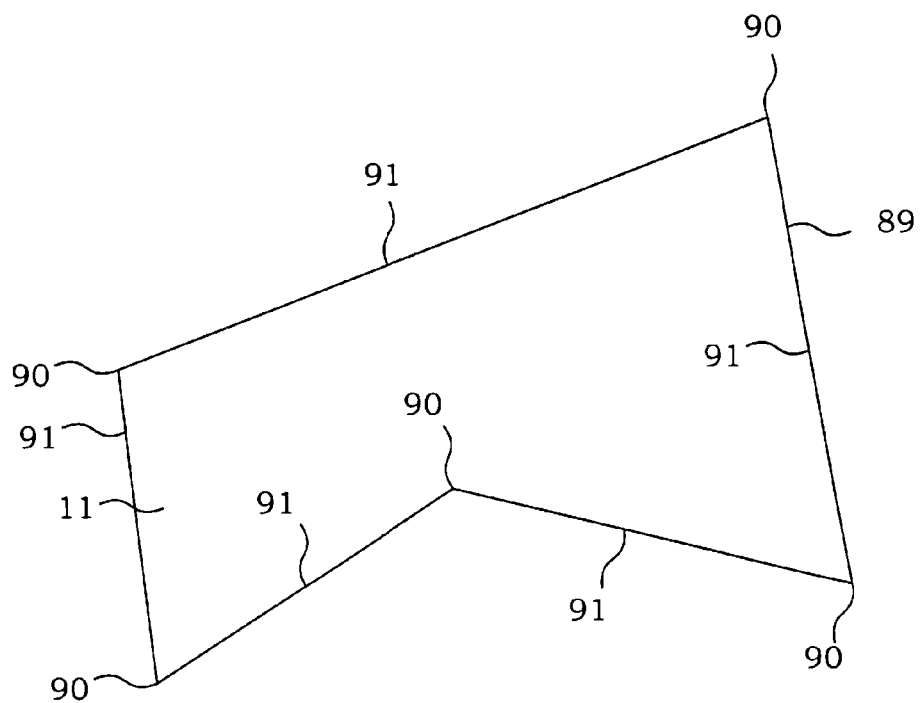
FIG. 11 is an example of a cell polygon.

In several systems, among these the WCDMA (Wideband Code Division Multiple Access) system, the preferred representation of the geographical extension of the cell is given by a cell polygon format. The extension of a cell is described by 3-15 corners of a closed polygon which does not intersect itself. The format is two-dimensional and the corners are determined as pairs of longitudes and latitudes in the WGS84 geographical reference system. An example is illustrated in FIG. 11. There, an example of a cell polygon 89 with corners 90 is illustrated. The RBS (Radio Base Station) is typically located close to one of the corners 90 of the cell polygon 89 said RBS serves. 3GPP systems provide for a messaging format for cell polygons. In the present invention, when splitting into subclusters has been performed, an area corresponding to a specific cell relation configuration comprises more than one polygon.

Furthermore, when the present invention is used as cell-ID positioning method, a number of re-calculated polygons, rather than pre-calculated polygons, that corresponds to the specific identity of the cell is reported over RANAP or Iupc (a logical interface between a RNC and a SAS within the UTRAN).

If the present invention is used as enhanced cell identity positioning, making use of soft(er) handover active sets or detectable cell sets, a similar reporting can take place. In case there are re-calculated polygons stored for the determined cell relation configuration, then the re-calculated polygons are selected and reported over RANAP or Iupc. Again, the invention fits directly into the existing positioning interfaces.

The area definition data should be organized so that it can be efficiently addressed using cell relation configuration information. In this way, fallback areas covering replacement regions, can be found whenever areas for certain regions have not been computed. Note that this situation may occur e.g. because of insufficient measurement statistics.

For instance. in case no polygon is computed for the specific cell relation configuration, then the hierarchical structure of the stored cell relations and area definitions is exploited in some way. One alternative is to disregard the last cell identity of the cell relation configuration and look for the re-calculated polygon for the so reduced cell relation configuration. In case there is a re-calculated polygon for this reduced cell relation configuration, then this polygon is reported over RANAP or Iupc. In case there is still no polygon computed then the second last cell identity of the cell relation configuration is removed and the procedure repeated. This procedure can continue up to top level. where the cell relation configuration corresponds to the serving cell. In case there would still not be a re-calculated polygon, the pre-calculated polygon can be used. It should be noted that there are many alternative strategies that are possible here.

Position determination assisting data obtained by the procedures described above may also be provided for positioning purposes as stored at a computer readable medium.

Figure 12:
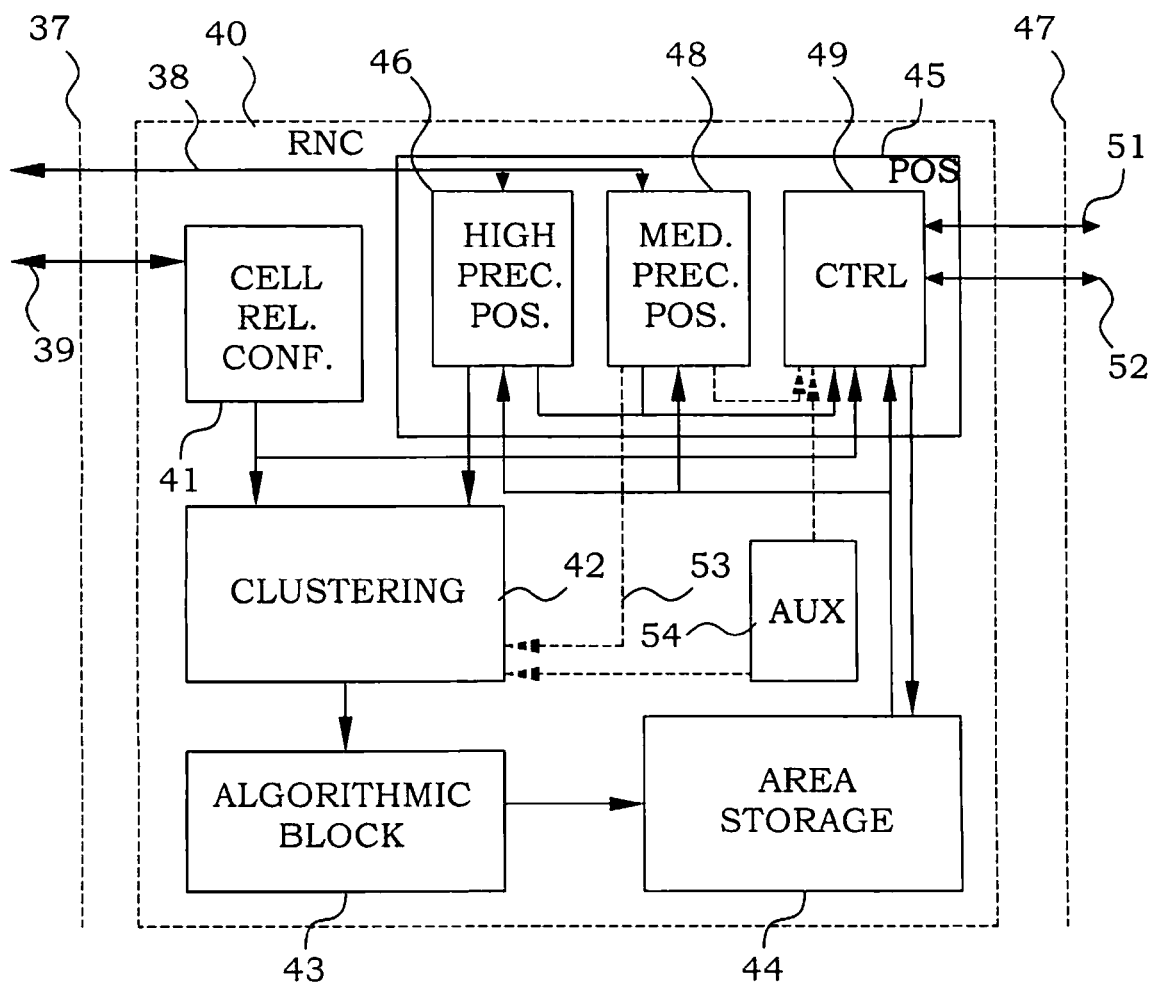
FIG. 12 is a block diagram of main parts of an embodiment of a node according to the present invention.

FIG. 12 is a block diagram of an embodiment of a positioning node 45 and related functionality according to the present invention. In the present embodiment, which is assumed to be comprised in a WCDMA system, such functionality is preferably comprised in the RNC 40. Another possibility is to implement the invention in the SAS node (e.g. an Ericsson SMLC) on the other side of the Iupc interface 47. Still another possibility is to log measurements and perform the algorithms in OSS-RC or even a completely external node. New interfaces and/or information elements in existing interfaces allowing for exchange of detected cell sets and measured high-precision position determination results may then be necessary.

In the case the position determination assisting data, i.e. the relations between the cell relation configurations and the associated areas are produced in an external node, the information has to be provided to a positioning node in order to assist in position determination procedures. The position determination assisting data can then preferably be stored at a computer readable medium, and supplied to the positioning node in a suitable manner, e.g. by downloading the content over a communication link or simply by providing a data memory device having the data stored therein, The RNC 40 communicates with UEs, transparently via RBSs, using the RRC interface 37. In the present context, at least two information types are of interest: positioning measurements 38, in particular high-precision positioning measurements, and neighbouring cell signal measurements 39, e.g. handover measurements. The neighbouring cell signal measurements 39 are provided to cell relation configuration determining section 41, determining the cell relation configuration. In a particular embodiment, the cell relation configuration determining section 41 can be based on a prior-art active set functionality. The determined cell relation configuration of a particular user equipment is provided to a clustering section 42.

The positioning measurements 38 are provided to the positioning node 45. The high-precision positioning measurements are provided to a high-precision positioning section 46, which e.g. can comprise UTDOA or A-GPS based positioning. Other positioning measurements, e.g. cell ID or KIT positioning measurements are in the present embodiment provided to a medium-precision positioning section 48. The outcome of the analysis of the high-precision positioning measurements, i.e. high-precision positions are provided to the clustering section 42, where the high-precision position is associated with a corresponding cell relation configuration. The measurements are clustered depending on the cell relation configuration and in particular embodiments also on other selection criteria such that auxiliary information and/or auxiliary measurements, in particular recording time, utilised RAB and/or RTT measurements. RTT measurements could then e.g. be provided by the medium-precision positioning section 48 as indicated by the broken arrow 53. Auxiliary information, such as time or utilised RAB, and other auxiliary measurements can be provided by an auxiliary information section 54. This auxiliary information section 54 can be arranged to provide the information internally in the node and/or be arranged to achieve the information from outside.

In case a main cluster would benefit from being split into subclusters, the clustering section 42 is arranged for performing the procedures discussed above. The clusters (one or several) of positions for a certain cell relation configuration and in some embodiments selected within a specific time interval or using a specific RAB are provided to an algorithmic block 43. In the algorithmic block 43, area definitions are calculated. One important objective of the present invention, to compute an area that describes each cluster of measurements, at a specified confidence level, is performed in the algorithmic block 43. In the WCDMA case, the preferred area definition is a polygon defined by 3 to 15 corner coordinates. In case of split subclusters, the area definition becomes a group of polygons, preferably having maximum 15 corner coordinates together. In a particular embodiment, the algorithmic block 43 provides polygons such that the probability that a given fraction of high-precision measurements of a cluster are located in the interior of the polygon. This algorithmic block 43 preferably performs repeated re-calculations of polygons, for all measurement clusters with a sufficient number of recent enough high-precision measurements. The area definitions are provided to an area storage 44, where polygons representing a hierarchically organized set of cell relation configurations are stored. The stored polygons are then used by positioning algorithms of the system. The data structure of the stored polygons preferably contains a list of pointers covering each relevant cell relation configuration. Each such pointer points to a corresponding 3-15 corner polygon, or a group of corresponding polygons, computed repeatedly as described above. The data structure preferably also contains a time tag for each polygon or group of polygons that defines the time when the polygon or group of polygons were computed.

When a position determination according to the principles of the present invention is requested, a cell relation configuration is determined in the cell relation configuration determining section 41 as usual. The result is forwarded to a control section 49 in the positioning node 45. When a positioning request 51 is received. e.g. a so-called Location Reporting Control message over the RANAP interface 47, the control section 49 may, based on quality of service parameters and UE capability, request a position determination by retrieving an area definition from the area storage 44, which corresponds to the present cell relation configuration of the UE. The achieved area definition, preferably a polygon definition or a definition of a group of polygons is included in a positioning reporting message 52, which typically is sent back over the RANAP interface 47 using e.g. a so-called Location Report message. As in the phase of creating the position determination assisting data, auxiliary information, such as time or utilised RAB, and other auxiliary measurements can also be used to refine the selection of the area definition. Such data is achieved by the auxiliary information section 54.

If the area definitions are to be used together with any additional positioning method, the retrieved area from the area storage 44 is provided to the high-precision positioning section 46 or the medium-precision positioning section 48, depending on the method to be used. The final determined position is then provided to the control section 49 for further reporting.

Most functionalities of the cell relation configuration determining section 41, the high-precision positioning section 46, the medium-precision positioning section 48 and the control section 49 are typically available in prior art systems. However, connections creating relations between the cell relation configuration determining section 41 on one side and the high-precision positioning section 46, the medium-precision positioning section 48 and the control section 49 on the other side are previously unknown. Furthermore, the clustering section 42, the algorithmic block 43, the area storage 44 as well as connections thereto are entirely novel. So is also functionality in the cell relation configuration determining section 41, the high-precision positioning section 46, the medium-precision positioning section 48 and the control section 49 needed for communicating with these novel functionalities.

A preferred embodiment of the invention can be summarized as follows. Algorithms for splitting of a main cluster of high precision position measurements into multiple subclusters that, taken together, cover an area that is smaller than the original cluster, are provided. Thereby the accuracy of the AECID positioning algorithm can be enhanced.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

Appendix A

Clustering

In this particular embodiment, it is assumed that the cell relation configuration is based on the active list of cells, i.e. cells active in soft handover. Corresponding modelling is possible also for other cluster selection rules.

The high-precision position measurements are typically obtained expressed in the WGS 84 geographical reference system. The measurements that are available at time t are denoted $$(lat_j(t_j)\ long_j(t_j))^T, j=1, \ldots, N(t). \quad (1)$$

where $lat_j(t_j)$ and $long_j(t_j)$ denote the measured latitude and longitude, respectively, at the time $t_j$. N(t) denotes the total number of available measurements at time t. $(\ )^T$ denotes matrix/vector transpose.

At the same time $t_j$ (to within some reasonable accuracy in time), the cell relation configuration is sampled for cell identities. The result is the row vector (or pointer)

$$\text{Configuration }(t_j)=(cID_1(t_j)\ cID_2(t_j) \ldots cID_{N(t_j)}(t_j)), \quad (2)$$

where $cID_1(t_j)$ is the cell identity of the l:th strongest cell in e.g. softer handover, for the UE for which high-precision positioning was performed at time $t_j$. $N(t_j)$ is the number of cells in the cell relation configuration at time $t_j$.

An arbitrary possible pointer (or equivalently tag) used for clustering of measurements, defined according to (2), is now denoted by $$\text{Pointer}_k=(\text{Index}_1(k) \ldots \text{Index}_{N(k)}(k)), k=1, \ldots, K \quad (3)$$

where $\text{Index}_l(k)$ is the l:th component of the (fix) pointer k, N(k) is the dimension of the pointer k and K is the number of counters. The corresponding list of high-precision position measurements is denoted by $\text{List}_k$. At time t:

$$\text{List}_k(t) = \begin{pmatrix} lat_{k,1}(t_{k,1}) & lat_{k,2}(t_{k,2}) & \ldots & lat_{k,M(k,t)}(t_{k,M(k,t)}) \\ long_{k,1}(t_{k,1}) & long_{k,2}(t_{k,2}) & \ldots & long_{k,M(k,t)}(t_{k,M(k,t)}) \\ t_{k,1} & t_{k,2} & \ldots & t_{k,M(k,t)} \end{pmatrix}, \quad (4)$$

where M(k,t) denotes the number of high-precision measurements of list k at time t. As stated above, measurements that are older than a pre-specified threshold are discarded from each list. The maximum size of a list can also be pre-specified, in which case the oldest measurement is discarded irrespective of its age when a new measurement arrives.

When a new high-precision measurement and corresponding cell relation configuration is obtained at time $t_{N(t)+1}$ the clustering algorithm operates as follows:

---

For k = 1 to K
   If $\text{Pointer}_k = \text{Configuration}(t_{N(k)+1})$ $$\text{List}_k(t_{N(k)+1}) = \left( \text{List}_k(t) \begin{pmatrix} lat_{N(t)+1}(t_{N(t)+1}) \\ long_{N(t)+1}(t_{N(t)+1}) \\ t_{N(t)+1} \end{pmatrix} \right)$$

end
   else
      do nothing
   end
end

---

Appendix B

Calculation of Local Densities of Points

This step introduces the algorithmic parameter $\lambda^p$—the fraction of the total extension of the main cluster p, that is used for definition of the limiting circle, within which the local density of points is to be computed, for each point $(x_i^p\ y_i^p)^T, i=1, \ldots, N^p$. Note that this fraction may be different for different clusters p.

The total extension of the cluster p follows as $$R^p = \max_{i,j} \|(x_i^p\ y_i^p) - (x_j^p\ y_j^p)\|_2 = \max_{i,j} \sqrt{(x_i^p - x_j^p)^2 + (y_i^p - y_j^p)^2}. \quad (5)$$

The radius of the circle, used for evaluation of the local density of points becomes $$r^p = \lambda^p R^p. \quad (6)$$

The local density of points, for each point in the cluster p follows as $$\rho_i^p = \frac{1}{\pi(r^p)^2} \sum_{j \| \|(x_i^p\ y_j^p)\| \leq r^p} 1. \quad (7)$$

A typical value of $\lambda^p$ may be 0.02-0.10.

Appendix C

Selection of Stopping Density Threshold

First, a threshold $\rho^{p,threshold}$, below which the stepping to a next nearest neighbour is stopped has to be determined. A specific problem is then that the number of points $N^p$ in a cluster, as well as the maximal extension of the clusters may vary significantly. For this reason, it is not possible or at least not preferable to set a globally valid value of the threshold, it needs to be set taking the points of each cluster in consideration.

Instead, in "stopping regions" $\rho_i^p$ should be close to the lowest observed values of the original cluster. Due to the low local density $\rho_i^p$ in "stopping regions", the vast majority of points in the original cluster has higher densities than the points in stopping regions. Using these two observations, the following approach for threshold setting is preferably adopted. The densities $\rho_i^p$, i=1, . . . . , $N^p$ are first sorted in descending order, resulting in the decreasing sequence of densities:

$$\{\rho_{i(j)}^p\}_{i=1}^{N_p}. \quad (8)$$

The mapping i(j) reflects the sorting of densities in descending order. A relative percentile type parameter $\gamma^p$, that may depend on the cluster p, is then introduced in order to point out the index of (8) that is such that:

$$i(j)=[\gamma^p N^p], \quad (9)$$

where [ ] denotes the integer of the argument. Typically $\gamma^p$ may be selected in the interval 0.8-0.95, meaning that 20%-5% of the points have lower local density values than the one corresponding to the selected $\gamma^p$. The absolute stopping threshold, is then selected as:

$$\rho^{p,threshold} = \rho^p_{i(j')}. \qquad (10)$$

The approach has the advantage that it is normalized, or adaptive, with respect to both the number of points in each original cluster and the geographical extension of each geographical cluster. This is a preferred prerequisite for autonomous operation in a system with thousands of original AECID clusters, each cluster corresponding to a specific cell, or sub-region of a cell Split Cluster Formation In order to describe the algorithm for formation of split clusters, i.e. forming of subclusters, the following notation and variables will be used below:

$SC^p$—The number of the subcluster.

$N^{p,SC}$—The maximum number of subclusters.

$c^p(i)$, $i=1, \ldots, N^p$—The number of the subcluster, to which the point $(x_i^p \ y_i^p)^T$ belongs. $c^p(i)=0$ means that the point does not yet belong to a subcluster.

usedForStart(i), $i=1, \ldots, N^p$—A Boolean that indicates which of the points that have been used as starting points for a new "closest neighbour stepping" search.

The algorithm can now be written in pseudo-code as follows, for one original cluster p. "%" signs are used for comments:

```
SC = 1                                        %-start with first subcluster
ClusterSplittingNotReady = 'True'
While (clusterSplittingNotReady)
    usedForStart(i) = 0, i = 1, ..., N^p       %-init not used start point indicator
    i^max = arg max{ρ_i^p | c(i) ≡ 0}          %-find the index of the un-used
         i
                                               point with maximum local
                                               density
    c^p(i^max) = SC                            %-mark starting point with
                                               subcluster number
    ClosestNeighbourStepping = 'True'
    while (closestNeighbourStepping)
        {i^SteppingStart(j)}_{j=1}^M = {c^p(i) ≡ SC AND usedForStart(i) ≡ 0}
        %-find possible starting points for closest neighbour stepping
        if (M > 0)                             %-if there is at least one-pick
                                               the first one and start
            usedForStart(i^SteppingStart(1)) = 1     %-mark it
            (x_{i^SteppingStart(1)}^p, y_{i^SteppingStart(1)}^p)^T
                                               %-Initialize with starting point
            endOfThisStepping = 'False'
            while (Not endOfThisStepping)
                %-One neighbour stepping to local density
threshold
                i^Closest = arg min{||thisPoint − (x_p^i  y_p^i)|| | i ≠ i^SteppingStart, c^p(i) ≡ 0}
                         i
                %-find index of closest neighbour point
                if
                    (ρ_{i^Closest}^p > ρ^{p,threshold})
                                               %-local density large enough to
                                               add point to current
                                               subcluster?
                    c^p(i^Closest) = SC
                    thisPoint = (x_{i^Closest}^p  y_{i^Closest}^p)^T
                else                           %-Local density to small-try
                                               another round of stepping
                    endOfThisStepping = 1
                end
            end                                %-To while loop
            {i^SteppingStart(j)}_{j=1}^M = {c^p(i) ≡ SC  AND  usedForStart(i) ≡ 0}
            %-try to find new starting points for
            closest neighbour stepping
        end                                    %-To if M>0 clause
        if (M = 0)                             %-if there is no starting point-this
                                               subcluster is done
            closestNeighbourStepping ='False'
        end
    end
                                               %-Remains to check if all sublusters are done?
    if (c^p(i) > 0, ∀i  OR  SC > N^{p,SC})
        clusterSplittingNotReady ='False'
    end
    if (SC < N^{p,SC})
        SC = SC + 1
    end
end
```

Appendix D

Test of Small Subclusters

In order to formalize the test for small subclusters it is noted that it can be formulated as:

$$N^P(SC) > v^P N^P. \quad (11)$$

Here $N^P(SC)$ is the number of points in the subcluster with number SC. $N^P$ denotes the total number of points in the original main cluster, and $v^P$ is a threshold. A typical value for $v^P$ may be 0.05. Subclusters that do not fulfill (11) are discarded.

Test of Small Encircling Subclusters I

One proposed embodiment is based on the observation that, contrary to a correct split cluster, all points in a circumventing or encircling subcluster has a large minimal distance to a centre of gravity of the subcluster. A measure using the quotient between the mean distance to the centre of gravity and the minimum distance to the centre of gravity should be successful. In order to formalize the test the centre of gravity of all subclusters are computed as:

$$(x^p_{CG}(SC) \quad y^p_{CG}(SC))^T = \frac{1}{N^P(SC)} \sum_{\substack{j=1 \\ c(j)=SC}}^{NP} (x^p_j \quad y^p_j)^T, \quad (12)$$

$$SC = 1, \ldots, N^{p,SC}.$$

The mean distance and the minimum distance between points in the subcluster and the center of gravity of the subcluster, are then computed:

$$r^p_{mean}(SC) = \frac{1}{N^P(SC)} \sum_{\substack{j=1 \\ c(j)=SC}}^{NP} \|(x^p_j \quad y^p_j) - (x^p_{CG}(CG) \quad y^p_{CG}(SC))\|_2, \quad (13)$$

$$r^p_{min}(SC) = \min_i \|(x^p_i \quad y^p_i) - (x^p_{CG} \quad y^p_{CG})\|. \quad (14)$$

The test quantity:

$$\xi(SC) = \frac{r_{mean}(SC)}{r_{min}(SC)}, SC = 1, \ldots, N^{p,SC} \quad (15)$$

is then computed. Since the first subcluster formed cannot normally become a circumventing subcluster, it follows that the remaining subclusters can be compared to the first subcluster. Subclusters are discarded whenever:

$$\frac{\xi(1)}{\xi(SC)} > \tau^p, \quad (16)$$

where the threshold $\tau^p$ is typically 5-10.

Test of Small Encircling Subclusters II

Another proposed embodiment is based on the observation that, contrary to a correctly split cluster, an average of the local density of points differs considerably compared with a ratio between a total number of points included in the subcluster and an area spanned by the points in the subcluster. A measure using the quotient between these two quantities should be successful. The average of the local density of points of subcluster SC is given by:

$$\hat{\rho}^P(SC) = \frac{1}{N^P(SC)} \sum_{\substack{j=1 \\ c(j)=SC}}^{NP} \rho^p_j, SC = 1, \ldots, N^{p,SC}. \quad (17)$$

The area spanned by the points in the subcluster may be more intricate to calculate. However, the square of the maximum distance between any two points in the subcluster will give an estimate of the area. Such a quantity is obtained by:

$$A^P(SC) = (R^P(SC))^2, SC = 1, \ldots, N^{p,SC}. \quad (18)$$

where $R^P$ is given by (5). Subclusters are discarded whenever:

$$\frac{\hat{\rho}^P(SC)}{N^P(SC)/A^P(SC)} > \tau^P, \quad (19)$$

where the threshold $\tau^p$ is typically 2-5.

The invention claimed is:

1. Method for clustering position determinations for providing position determination assisting data in a cellular communications network, the method comprising:
    obtaining a main cluster of points being results of high-precision position determinations for different positions of user equipment terminals in communication with the cellular communications network; and
    separating out the points that are the results of the high-precision position determinations into at least two subclusters of the points, the respective points of each of the subclusters having a local positional density of points above a predetermined local positional density threshold, where said separating out comprises,
    determining a local positional density of points for each point in said main cluster of points,
    selecting a point in said main cluster of points having a local positional density of points larger than said predetermined local positional density threshold to be included in a first subcluster, and
    including points of said main cluster of points in said first subcluster, said points included in said first subcluster having a local positional density of points that is larger than said predetermined local positional density threshold.

2. Method according to claim 1, where said points included in said first subcluster having a distance to any other point included in said first subcluster that is smaller than a predetermined distance threshold.

3. Method according to claim 2, where said selecting a point in the main cluster of points comprises selecting said point as a first reference point; and
    said including points comprises:
    selecting a candidate point of said main cluster of points not being included in said first subcluster;
    checking if said candidate point having a local positional density of points that is larger than said predetermined local positional density threshold and having a distance to said reference point that is smaller than said predetermined distance threshold;
    including said candidate point in said first subcluster if a local positional density of points of said candidate point is larger than said predetermined local positional density threshold and if said candidate point having a distance to said reference point that is smaller than said predetermined distance threshold; and repeating the selecting a candidate point, the checking, and the including the candidate point until no further points not being included in said first subcluster having a local positional density of points that is larger than said predetermined local positional density threshold and having a distance to said reference point that is smaller than said predetermined distance threshold remain.

4. Method according to claim 3, where said including points comprises:

selecting a new reference point among points in said first subcluster not previously being selected as a reference point;

repeating the selecting a candidate point, the checking, the including the candidate point, and the selecting a new reference point until all points in said first subcluster have been utilized as a reference point.

5. Method according to claim 1, where said selecting a point in the main cluster of points comprises selecting the point in said main cluster of points having a highest local positional density of points to be included in a first subcluster and being selected as a start point; and said including points comprises:

selecting said start point as a reference point;

finding a closest neighbour point of said main cluster of points not being included in said first subcluster and not being utilized as start point;

checking if said closest neighbour point having a local positional density of points that is larger than said predetermined local positional density threshold;

including said closest neighbour point in said first subcluster and selecting said closest neighbour point as new reference point if a local positional density of points of said candidate point is larger than said predetermined local positional density threshold; and repeating the finding a closest neighbour point, the checking if the closest neighbour point, and the including the closest neighbour point until said closest neighbour point having a local positional density of points that is smaller than said predetermined local positional density threshold;

selecting a point included in said first subcluster not previously being utilized as start point as a new start point; and repeating the selecting the starting point, the finding a closest neighbour point; the checking if the closest neighbour point; the including the closest neighbour point, and the including the closest neighbour point; and the selecting the point included in the first subcluster until all points included in said first subcluster have been utilized as start points.

6. Method according to claim 1, where selecting a point comprises selecting a first point, and where said separating out comprises:

selecting a second point in said main cluster of points having a local positional density of points larger than said predetermined local positional density threshold and not being included in any of the first subcluster to be included in a second subcluster; and including points of said main cluster of points in said second subcluster, said points included in said second subcluster having a local positional density of points that is larger than said predetermined local positional density threshold not being included in the first subcluster.

7. Method according to claim 6, where said separating out further comprises:

selecting a third point in said main cluster of points having a local positional density of points larger than said predetermined local positional density threshold and not being included in any of the first and second subclusters to be included in a third subcluster; and including points of said main cluster of points in said third subcluster, said points included in said third subcluster having a local positional density of points that is larger than said predetermined local positional density threshold not being included in the first subcluster.

8. Method according to claim 1, further comprising:

discarding subclusters having less than a predetermined number of included points.

9. Method according to claim 1, further comprising:

removing encircling subclusters.

10. Method according to claim 9, where the removing encircling subclusters comprises discarding of said encircling subclusters.

11. Method according to claim 9, where the removing encircling subclusters comprises splitting of said encircling subclusters into further subclusters.

12. Method according to claim 9, where the removing encircling subclusters comprises comparing an average of said local positional density of points with a ratio between a total number of points included in said encircling subcluster and an area spanned by said points in said encircling subcluster.

13. Method according to claim 9, where the removing encircling subclusters comprises comparing an average distance between points included in said encircling subcluster and a center of gravity of said points included in said encircling subcluster with a minimum distance between any of said points included in said encircling subcluster and said center of gravity of said points included in said encircling subcluster.

14. Method according to claim 1 wherein the high-precision position determinations are configured to provide positioning accuracy of 100 meters at 67% and positioning accuracy of 300 meters at 95%.

15. Method according to claim 1 wherein the high-precision position determinations are made using Global Positioning System (GPS) positioning and/or Uplink Time Difference Of Arrival (UTDOA) positioning.

16. Method according to claim 1 wherein obtaining the main cluster comprises obtaining the main cluster at a clustering section of the communications network and wherein separating out the points comprises separating out the points at the clustering section of the communications network.

17. Method according to claim 1 further comprising:

providing a position determination for a particular user equipment terminal using at least one of the subclusters.

18. Method for providing position determination assisting data in a cellular communications network, the method comprising:

establishing a cell relation configuration for user equipment terminals, said cell relation configuration comprising at least cell identities of cells, in which signals to/from said user equipment terminals fulfill at least a specific radio condition criterion when received;

performing high-precision position determinations for different positions of said user equipment terminals;

repeating said establishing a cell relation configuration and said performing a high-precision position determinations a plurality of times;

clustering points being results of said high-precision position determinations belonging to the same cell relation configuration in separate main clusters of points;

splitting at least one of said separate main clusters of points into a plurality of subclusters;

associating an area definition with at least one of said main clusters of points; and creating position determination assisting data comprising a relation between said cell relation configurations and said associated area definitions;

where said splitting comprises, determining a local positional density of points for each point in said at least one of said main clusters of points, selecting a point in said at least one of said main clusters of points having a local positional density of points larger than a predetermined local positional density threshold to be included in a first subcluster, and including points of said at least one of said main clusters of points in said first subcluster, said points included in said first subcluster having a local positional density of points that is larger than said predetermined local positional density threshold.

19. Method according to claim 18, where the associating an area definition with at least one of said main clusters of points comprises:

associating a subarea definition with at least two of said subclusters of at least one of said main clusters of points; and defining said area definition as an aggregate of said subarea definitions.

20. Method according to claim 18 wherein the high-precision position determinations are made using Global Positioning System (GPS) positioning and/or Uplink Time Difference Of Arrival (UTDOA) positioning.

21. Arrangement for providing position determination assisting data in a cellular communications network, the arrangement comprising:

means for establishing a cell relation configuration for user equipment terminals, said cell relation configuration comprising at least cell identities of cells, in which signals to/from said user equipment terminals fulfill at least a specific radio condition criterion when received;

means for performing high-precision position determinations for different positions of said user equipment terminals in communication with the cellular communications network;

means for clustering results of said high-precision position determinations belonging to the same cell relation configuration in separate main clusters of points, said means for clustering results being further arranged for separating out, from at least one of said separate main clusters of points, at least two subclusters of the points, the respective points of each of the subclusters having a local positional density of points above a predetermined local positional density threshold; and means for associating an area definition with at least two of said subclusters of said main clusters of points and creating position determination assisting data comprising a relation between said cell relation configurations and said associated area definitions;

said means for clustering results being further arranged for, determining a local positional density of points for each point in said main cluster of points, selecting a point in said main cluster of points having a local positional density of points larger than said predetermined local positional density threshold to be included in a first subcluster, and including points of said main cluster of points in said first subcluster, said included points having a local positional density of points that is larger than said predetermined local positional density threshold.

22. Arrangement according to claim 21 wherein the high-precision position determinations are made using Global Positioning System (GPS) positioning and/or Uplink Time Difference Of Arrival (UTDOA) positioning.

23. Node of a cellular communications network, comprising:

an arrangement comprising:

means for establishing a cell relation configuration for user equipment terminals, said cell relation configuration comprising at least cell identities of cells, in which signals to/from said user equipment terminals fulfill at least a specific radio condition criterion when received;

means for performing high-precision position determinations for different positions of said user equipment terminals in communication with the cellular communications network;

means for clustering results of said high-precision position determinations belonging to the same cell relation configuration in separate main clusters of points, said means for clustering results being further arranged for separating out, from at least one of said separate main clusters of points, at least two subclusters of the points, the respective points of each of the subclusters having a local positional density of points above a predetermined local positional density threshold; and means for associating an area definition with at least two of said subclusters of said main clusters of points and creating position determination assisting data comprising a relation between said cell relation configurations and said associated area definitions;

where said means for clustering results being further arranged for, determining a local positional density of points for each point in said main cluster of points, selecting a point in said main cluster of points having a local positional density of points larger than said predetermined local positional density threshold to be included in a first subcluster, and including points of said main cluster of points in said first subcluster, said included points having a local positional density of points that is larger than said predetermined local positional density threshold.

24. Cellular communications network, comprising:

an arrangement comprising:

means for establishing a cell relation configuration for user equipment terminals, said cell relation configuration comprising at least cell identities of cells, in which signals to/from said user equipment terminals fulfill at least a specific radio condition criterion when received;

means for performing high-precision position determinations for different positions of said user equipment terminals in communication with said cellular communications network;

means for clustering results of said high-precision position determinations belonging to the same cell relation configuration in separate main clusters of points, said means for clustering results being further arranged for separating out, from at least one of said separate main clusters of points, at least two subclusters of the points, the respective points of each of the subclusters having a local positional density of points above a predetermined local positional density threshold; and means for associating an area definition with at least two of said subclusters of said main clusters of points and creating position determination assisting data comprising a relation between said cell relation configurations and said associated area definitions;

where said means for clustering results being further arranged for,
- determining a local positional density of points for each point in said main cluster of points,
- selecting a point in said main cluster of points having a local positional density of points larger than said predetermined local positional density threshold to be included in a first subcluster, and
- including points of said main cluster of points in said first subcluster, said included points having a local positional density of points that is larger than said predetermined local positional density threshold.

25. Non-transitory computer readable medium that stores instructions that, when executed by a processor, cause the processor to perform a method for clustering position determinations for providing position determination assisting data in a cellular communications network, the method comprising:

obtaining a main cluster of points being results of high-precision position determinations for different positions of user equipment terminals in communication with the cellular communications network; and separating out the points that are the results of the high-precision position determinations into at least two subclusters of the points, the respective points of each of the subclusters having a local positional density of points above a predetermined local positional density threshold, where said separating out comprises,
- determining a local positional density of points for each point in said main cluster of points,
- selecting a point in said main cluster of points having a local positional density of points larger than said predetermined local positional density threshold to be included in a first subcluster, and
- including points of said main cluster of points in said first subcluster, said points included in said first subcluster having a local positional density of points that is larger than said predetermined local positional density threshold.

26. Computer readable medium according to claim 25 wherein the computer readable medium comprises a data memory device.

* * * * *

UNITED STATES PATENT AND TRADEMARK OFFICE
CERTIFICATE OF CORRECTION

PATENT NO.         : 8,208,942 B2
APPLICATION NO.    : 12/447841
DATED              : June 26, 2012
INVENTOR(S)        : Wigren It is certified that error appears in the above-identified patent and that said Letters Patent is hereby corrected as shown below:

On the Face Page, in Field (75), under "Inventor", in Column 1, Line 1,
delete "Torbjorn" and insert -- Torbjörn --, therefor.

In Column 2, Line 14, delete "effects." and insert -- effects, --, therefor.

In Column 4, Line 13, delete "Network" and insert -- Access Network --, therefor.

In Column 5, Line 36, delete "accuracy." and insert -- accuracy, --, therefor.

In Column 5, Line 46, delete "though." and insert -- though, --, therefor.

In Column 6, Line 27, delete "above." and insert -- above, --, therefor.

In Column 7, Line 3, delete "view." and insert -- view, --, therefor.

In Column 8, Line 30, delete "necessary." and insert -- necessary, --, therefor.

In Column 8, Line 37, delete "words." and insert -- words, --, therefor.

In Column 9, Line 42, delete "possible." and insert -- possible, --, therefor.

In Column 13, Line 19, delete "points." and insert -- points, --, therefor.

In Column 13, Line 22, delete "are" and insert -- is --, therefor.

In Column 13, Line 26, delete "distance." and insert -- distance, --, therefor.

In Column 14, Line 42, delete "RTF" and insert -- RTT --, therefor.

Signed and Sealed this
Twentieth Day of November, 2012

David J. Kappos
*Director of the United States Patent and Trademark Office*

CERTIFICATE OF CORRECTION (continued)
U.S. Pat. No. 8,208,942 B2

In Column 14, Line 50, delete "218." and insert -- 218, --, therefor.

In Column 15, Line 30, delete "ways." and insert -- ways, --, therefor.

In Column 16, Line 32, delete "instance." and insert -- instance, --, therefor.

In Column 16, Line 43, delete "level." and insert -- level, --, therefor.

In Column 17, Line 6, delete "therein," and insert -- therein. --, therefor.

In Column 17, Line 24, delete "KIT" and insert -- RTT --, therefor.

In Column 18, Line 14, delete "received." and insert -- received, --, therefor.

In Column 21, Line 14, delete "cell" and insert -- cell. --, therefor.

In Column 22, Line 32, delete " $\left(x^P_{i SteppingStart(1)} \; y^P_{i Steppingstarty(1)}\right)^T$ ," and insert -- $\text{thisPoint} = \left(x^P_{i SteppingStart(1)} \; y^P_{i Steppingstarty(1)}\right)^T$ --, therefor.

In Column 22, Line 46, delete " $\text{thisPoint} = (x_i Closest^P \; y_i Closest^P)^T$ " and insert -- $\text{thisPoint} = (x^P_{i Closest} \; y^P_{i Closest})^T$ --, therefor.

In Column 22, Line 47, delete "to" and insert -- too --, therefor.

In Column 22, Line 61, delete "sublusters" and insert -- subclusters --, therefor.